United States Patent Office 2,721,188
Patented Oct. 18, 1955

2,721,188

ALPHA-HYDROXY ACIDS AND ESTOLIDES AND THEIR DERIVATIVES

Orville L. Poliy and Orin D. Cunningham, Long Beach, Calif., assignors to Union Oil Company of California, Los Angeles, Calif., a corporation of California No Drawing. Application April 19, 1948, Serial No. 21,846

9 Claims. (Cl. 260—78.3)

This invention relates to high molecular weight alpha-hydroxy acids and their estolides and to methods for their production. The invention further relates to the reactions and reaction products of the higher molecular weight alpha-hydroxy acids, estolides, and derivatives of the higher molecular weight alpha-hydroxy acids and estolides. More particularly, this invention relates to methods for the production and resolution of oxidized petroleum wax and other paraffin hydrocarbons, whereby relatively pure mixtures of alpha-hydroxy acids and/or their estolides are obtained. The invention further relates to the reactions of the alpha-hydroxy acids and/or estolide fractions obtained from oxidized wax mixtures and to the useful products which may be obtained from these reactions.

In general, the oxidation of both liquid and solid paraffinic hydrocarbons by blowing with an oxygen-containing gas yields an extremely complex mixture of products which vary not only as to functional groups but also according to molecular weight. The method and conditions of oxidation, as well as the nature of the hydrocarbon stock to be oxidized, each serve to determine independently the types and relative yields of the various possible oxygenated hydrocarbons obtained therefrom. It has been found that by suitable choice of oxidizing conditions and oxidation feed stocks, the oxidation may be directed to the selective production of certain new and valuable oxygenated derivatives, and particularly to the increased and selective production of the higher molecular weight alpha-hydroxy acids and/or estolides of the higher molecular weight alpha-hydroxy acids. Within the bounds of this choice, a further selection of conditions is possible wherein the concurrent production of undesirable by-products is minimized.

In the past, the extensive industrial utilization of oxidized wax components has been retarded by the almost complete lack of knowledge concerning the specific chemical structures of the compounds present therein and the similar lack of knowledge concerning the chemical reactions which these higher molecular weight compounds may undergo under proper conditions. A study of the structures of the components of oxidized wax has, itself, been hampered by the lack of suitable methods for resolving the oxidized wax mixtures into their respective chemical classes and in a degree of purity which would allow significant data to be obtained regarding the chemical properties and construction of the individual chemical classes. The structural studies of oxidized wax fractions has been complicated still further by the fact that certain reactive components which occur in oxidized wax are converted into other compounds in the presence of the chemicals customarily used in many of the previously used separation and resolution procedures. In some cases, the reactions have been found to be reversible, e. g., the rapid reaction of the alpha-hydroxy acids to form estolides, while in other cases the reactions are relatively irreversible under the conditions usually employed, e. g., the dehydroxylation of estolides, the decarboxylation of alpha-hydroxy acids, and the decarboxylation of estolides.

While it is well known to oxidize petroleum wax to produce wax oxidation products, such methods have failed to produce substantial amounts of the oxidation products of our invention. In such prior methods, it was recognized that the oxidation product contained principally poly-hydroxy alkanes, poly-hydroxy acids, lactones, lactides, and hydroxy acids such as beta, gamma, and omega hydroxy acids whereas in our process, we are able to produce substantial amounts of alpha-hydroxy acids and/or estolides. According to our invention, we have been able to obtain yields of up to 50 per cent by weight of pure alpha-hydroxy acid-estolide fractions and only traces, i. e., less than about two per cent, of the aforementioned compounds obtained by the prior investigations.

Thus, we have established that the water-insoluble portion of oxidized wax prepared according to our invention comprises mainly fatty acids, alpha-hydroxy acids, and estolides (hemilactides) of alpha-hydroxy acids, together with varying amounts of unreacted wax and lesser amounts of oxygenated neutral compounds. The oxygenated neutral fraction comprises the esters derived from high molecular weight alcohols and alpha-hydroxy acids and also with lesser amounts of various high molecular weight mono-functional alcohols and aldehydes.

It is thus a primary object of this invention to provide a method for the synthesis of alpha-hydroxy acids and/or estolides from paraffin wax wherein the alpha-hydroxy acids and/or estolides contain between 6 and 50 carbon atoms per molecule.

Another object of this invention is to provide a method for the synthesis of higher molecular weight alpha-hydroxy acids and/or their estolides which comprises oxidizing paraffinic hydrocarbons having between 15 and 50 carbon atoms per molecule.

Another object of this invention is to provide a method for the oxidation of selected petroleum wax whereby high yields of relatively pure alpha-hydroxy acid-estolide fractions are obtained, which fractions are uncontaminated with poly-hydroxy compounds and/or hydroxy acids other than alpha-substituted alpha-hydroxy acids.

Another object of this invention is to provide a process for the production of alpha-hydroxy acids and their estolides by oxidation of selected petroleum wax fractions wherein the alpha-hydroxy acid-estolide product is relatively free of oxygenated neutral contaminants.

An additional object of this invention is to produce a relatively pure mixture of higher molecular weight alpha-hydroxy acids and their estolides which mixture comprises approximately 70 mole per cent of estolides and 30 mole per cent of alpha-hydroxy acids.

Another object of this invention is to provide a method for the synthesis of relatively pure alpha-hydroxy acids from the estolides of these acids.

A further object of this invention is to produce substantially pure alpha-hydroxy acids from the alpha-hydroxy acid-estolide fraction obtained by the oxidation of selected petroleum wax fractions and/or other normal paraffinic hydrocarbons.

Another object of this invention is to provide a method for the synthesis of relatively pure estolides from alpha-hydroxy acids and from mixtures of such acids and estolides wherein the estolides are substantially free of dehydroxylated estolides.

An additional object of this invention is to provide a method for the preparation of substantially pure estolides from the mixture of estolides and alpha-hydroxy acids obtained by the oxidation of selected petroleum wax fractions.

It is a further object of this invention to provide a process for the esterification of estolides and/or alpha-hydroxy acids and/or mixtures of alpha-hydroxy acids and estolides whereby the ester of the normal estolide is the primary product. A further object of this invention is to effect such esterification by reaction with an alcohol.

A further object of this invention is to provide a process for the reaction of an alcohol with an alpha-hydroxy acid wherein the principal product of the reaction is an ester of the alpha-hydroxy acid.

A further object of this invention is to dehydroxylate estolides to produce esters of high molecular weight substituted acrylic acids with alpha-hydroxy acids.

Another object of this invention is to provide a process for the synthesis of unsaturated estolides from the mixtures of estolides and alpha-hydroxy acids such as are obtained from the oxidation of paraffin wax.

An additional object of this invention is to provide a process for the synthesis of dehydroxylated estolides from relatively pure alpha-hydroxy acids.

A further object of this invention is to provide a process for the production of esters of unsaturated estolides under conditions which minimize the polymerization of the unsaturated estolide.

A further object of this invention is to provide a process for the dehydroxylation of esters of estolides whereby a dehydroxylated estolide ester is obtained.

Another object of this invention is to provide a process for the esterification of unsaturated estolides whereby esters of unsaturated estolides are obtained.

It is a further object of this invention to provide new and useful polymers of unsaturated estolides or esters of unsaturated estolides.

It is an important object of this invention to produce esters by reaction of alpha-hydroxy acids or estolides with poly-functional alcohols and also by reaction of mixtures of estolides and alpha-hydroxy acids with poly-functional alcohols.

An additional object of this invention is to produce esters by the reaction of unsaturated estolides with poly-functional alcohols and also to produce polymers of such esters.

Another object of the invention is to employ catalysts in the reactions involving the production of estolides, the esters of estolides and dehydroxylated estolides and also in the esterification of alpha-hydroxy acids.

It is an object of this invention to react mono- or poly-functional alcohols with alpha-hydroxy acids or estolides or a mixture of alpha-hydroxy acids and estolides in the presence of an added agent which prevents the reaction mixture from gelling prematurely and thus produce products which are soluble in paint vehicles and possessing drying properties. It is an object of this invention to employ organic acids and specifically organic acids having more than 8 carbon atoms and containing a conjugated diene group, particularly rosin, in such reactions, and also to employ non-acidic substances containing a conjugated diene grouping, particularly styrene, in such reactions.

It is another object of this invention to prepare esters of mono- and poly-functional alcohols with unsaturated estolides employing such agents as rosin in the esterification reaction.

It is a specific object of this invention to react glycerol with alpha-hydroxy acids and/or estolides in the presence of rosin whereby a reaction product is obtained which is both esterified and completely dehydroxylated.

Another object is to promote the dehydroxylation of esters of estolides by the use of such agents as rosin.

Briefly, this invention involves the synthesis of alpha-hydroxy acids and their estolides by the oxidation of selected paraffin wax fractions wherein the alpha-hydroxy acids range mostly from approximately 5 to 30 atoms per molecule, and the estolides range from approximately 10 to 60 atoms per molecule. The petroleum wax fraction is oxidized by blowing the melted wax with an oxygen-containing gas at moderate temperatures until a relatively high acid number has been obtained. According to our invention, relatively pure mixtures of alpha-hydroxy acids and estolides are recovered from the oxidized paraffin wax.

In the preferred modification the separation of the alpha-hydroxy acid-estolide fraction from water-washed oxidized wax is accomplished by extracting the water-washed oxidized wax by a borax method which involves the use of a concentrated solution containing an alkali metal borate, such as sodium borate, with which salt the alpha-hydroxy acids and estolides form a complex, thereby solubilizing them in the aqueous phase and effecting their removal from the remaining neutral and acidic constituents. The alpha-hydroxy acids and their estolides are recovered as a mixture from the borate solution by acidification of the borate solution, which acidification liberates the free acids and estolides as an oil phase. This method yields a product ranging up to about 97% purity which is unobtainable by previously used methods.

This invention also involves the reactions of the alpha-hydroxy acids and estolides obtained from the oxidation of wax and isolated therefrom by the borax method and/or other separation methods, and to the higher alpha-hydroxy acids and estolides which may be prepared from other sources. The invention also relates to the useful products and derivatives which can be obtained from the alpha-hydroxy acids and their estolides. The mixture of alpha-hydroxy acids and estolides isolated from oxidized wax mixtures comprises about 70 mole per cent of estolides and about 30 mole per cent of alpha-hydroxy acids. Under suitable reaction conditions, the pure estolides may be prepared from the mixture obtained from oxidized wax as well as from similar mixtures derived from other sources. Substantially pure alpha-hydroxy acids may also be prepared from mixtures of alpha-hydroxy acids and estolides or from the pure estolides themselves.

The estolides have been found to undergo a new reaction wherein a molecule of water is split out with the formation of a new series of compounds which have been designated unsaturated or dehydroxylated estolides. The new series of compounds are the esters derived from the reaction of one molecule of a high molecular weight substituted acrylic acid with one molecule of an alpha-hydroxy acid. The dehydroxylation reaction may be controlled to yield substantially pure unsaturated estolides. By the hydrolysis of the unsaturated estolides, high molecular weight substituted acrylic acids may be prepared.

Estolides can be esterified to yield substantially pure esters of the estolide providing the conditions are suitably chosen to prevent the dehydration of the normal estolide to form an ester of a dehydroxylated estolide. The estolides themselves also tend to be dehydroxylated during their formation from alpha-hydroxy acids unless the conditions are chosen to prevent the formation of the dehydroxylated estolides. The dehydroxylated estolide may be esterified providing the conditions are suitably chosen to prevent the polymerization of the unsaturated estolide through its unsaturated bond system. Alpha-hydroxy acids may be reacted with alcohols in such a manner that the principal reaction product is the ester of the estolide, or under other conditions such that the ester of the dehydroxylated ester is preferentially formed. Under still different conditions, the reaction of alpha-hydroxy acids with alcohols can be directed to the production of the ester of the alpha-hydroxy acid as the principal reaction product.

Among the many new and useful chemical products which are derived from the estolides and/or alpha-hydroxy acids and/or their derivatives are many high molecular weight compounds. These products fall into two general groups, i. e., esters of polyfunction alcohols and alpha-hydroxy acids and/or their estolides, which are derived from the esterification of poly-functional alcohols and those which are derived from the polymerization of unsaturated estolides and unsaturated estolide esters. Thus, the reactions of alpha-hydroxy acids, estolides, dehydroxylated estolides and/or mixtures of these compounds with poly-functional alcohols yield high molecular weight esters which are variously useful as plasticizers, drying oil, linoleum cementing compositions, and the like. The polymerization of unsaturated estolides and/or unsaturated esters of estolides yields other useful compounds. The invention relates to the method for the production of these esters and polymers and also to the catalysts and the reaction conditions which favor the specific production of the individual types of desirable polymers.

In the preparation of certain dehydroxylated esters derived from alpha-hydroxy acids and/or their estolides and poly-functional alcohols, the products are often insoluble in the ordinary paint vehicles such as xylene, toluene and turpentine. During the esterification and dehydroxylation of the resulting ester a heavy gel sets up which necessitates stopping the reaction even though the esterification may have proceeded not more than half way to completion. Frequently, under these conditions, the desirable dehydroxylation will also be found incomplete. In such cases, the onset of gelation can be delayed and the desired reaction prolonged by the addition of certain organic acids to the original reaction mixtures. While we do not desire to be bound by theory, it is believed that these acids apparently peptize the gel and also enter into the esterification reaction wherein they may restrict cross-polymerization between the dehydroxylated structures derived from the alpha-hydroxy acids and/or estolides. An aromatic-soluble product of high ester-unsaturation content is thereby obtained. The aromatic-soluble products obtained by the esterification of the alpha-hydroxy acids and/or estolides with poly-functional alcohols and simultaneously or subsequently dehydroxylated are useful as substitutes for linseed oil in certain drying and cementing operations. Rosin is a particularly useful added organic acid during the esterification and dehydroxylation reactions of alpha-hydroxy acids and estolides and promotes the dehydroxylation of the esterified acids and/or estolides while repressing the simultaneous polymerization of the dehydroxylated material, thereby promoting the formation of an aromatic-soluble product.

The higher molecular weight alpha-hydroxy acids and/or their estolides are readily available from the oxidation products of a paraffin wax. The paraffin waxes which are most suitable for the preparation of alpha-hydroxy acids and estolides are those which are essentially mixtures of straight chain normal paraffins containing between 15 and 50 carbon atoms per molecule or more, and preferably between about 20 and 35 carbon atoms per molecule. The wax is preferably a higher melting wax such as those refined waxes which melt above 90° F. and preferably above 120° F.

The wax should be substantially free of any hydrocarbons containing aromatic rings since these compounds will oxidize to form inhibitors which repress further oxidation of the residual hydrocarbons. The wax to be oxidized should also be relatively free of hydrocarbons containing naphthene rings since these tend to form peroxides in the product which, in some cases, seem to decrease the yield of desirable oxidation products, and in other cases form products which are not readily removed from the desired alpha-hydroxy acid and estolide fraction.

A very suitable wax for the production of alpha-hydroxy acids and estolides is one which has been prepared by modern solvent refining technique. Thus, a topped residuum is extracted with liquefied propane to separate asphalt from the oil and the thus de-asphalted oil in propane solution is subsequently dewaxed by chilling to temperatures in the neighborhood of −40° F. to crystallize wax which is then separated from the propane-oil solution. The precipitated wax from the de-waxing step contains oil and this oil is removed by dissolving it in a solvent, such as methyl ethyl ketone, and chilled to precipitate a de-oiled wax. Such methods are well known and are generally described in U. S. Patent No. 2,229,658. The wax thus obtained by this and other solvent refining processes is relatively free of objectionable materials for wax oxidation purposes. The melting point of the refined wax is usually above 90° F. and may even be as high as 165° F. or more. Such waxes are substantially straight chain normal paraffins and are only slightly isoparaffinic. Although solvent refining gives a very desirable oxidation feed stock, waxes refined by other methods and from other sources may also be used in the process of this invention, such as refined tank bottoms wax and other petroleum-derived wax fractions.

The oxidation of the paraffin wax is carried out in the liquid phase by blowing the melted wax with an oxygen-containing gas until the desired acid number has been attained. The yield of alpha-hydroxy acids and estolides obtained by the oxidation of wax is closely dependent upon the temperature of the oxidation. High temperatures promote the decomposition of the alpha-hydroxy acids and estolides into a mixture of less desirable products and from which the alpha-hydroxy acids and estolides are less readily separated in pure form. The oxidation is preferably carried out at a temperature above the melting point of the wax and below 140° C. The preferred temperatre range is from 100 to 130° C. and it is in this temperature range that the greatest yield of the more easily refined alpha-hydroxy acids and estolides is obtained.

The concentration of alpha-hydroxy acids and estolides in the oxidized wax as well as the yield of these compounds per unit weight of wax is closely dependent upon the acid number to which the wax is oxidized. The greatest yield of the more easily refined alpha-hydroxy acids and estolides is obtained when the oxidation of the wax is continued until the acid number is between 200 and 250 and preferably in the range of about 210 to 240. When the oxidation is continued above these limits, considerable decomposition of the alpha-hydroxy acids takes place and the rate of decomposition may even exceed the rate of formation. When the oxidation is discontinued at acid numbers below the lower limits specified, the yield of alpha-hydroxy acids and their estolides is decreased and the yield of fatty acids is increased.

The term acid number represents the numerical value of the "acidity" which latter term has the units of mg. of KOH per gram. The method for the determination of acid numbers is described in "A. S. T. M. Standards on Petroleum Products and Lubricants," October 1947, page 639.

In the oxidation of wax to prepare alpha-hydroxy acids and estolides, the feed which comprises a petroleum paraffin wax which is predominantly composed of paraffinic hydrocarbons having between about 15 and 50 carbon atoms per molecule, and preferably between about 20 and 35 carbon atoms per molecule, is subjected to liquid-phase oxidation by contacting the melted wax with a gas containing free oxygen, such as air, oxygen-enriched air, oxygen and the like. The oxidation is preferably carried out under pressures which may vary between 2/10 and 20 atmospheres and preferably between normal atmospheric pressure and 10 atmospheres. The oxidation temperature is above the melting point of the wax being oxidized and below 140° C. and is preferably in the range of 100 to 130° C. The wax is melted and introduced into a reaction vessel which is equipped with means for both heating and cooling the contents. The vessel is preferably in the form of a vertical column provided with heating coils in the lower section, and is only partially filled with the molten wax in order to leave ample free space above the liquid to provide for foaming and vapor space. The melted wax is then heated to between about 100 and 130° C. by means of the heating coils and the gas containing free oxygen, such as air, is passed into the bottom of the vessel under pressure through a distributor which insures adequate dispersion of the air in the form of fine bubbles throughout the liquid. This insures efficient air utilization in the oxidation. The volumetric rate at which the air or other oxidizing gas is introduced may vary between about 1 and 20 cubic feet per barrel of hydrocarbon per minute. The barrel herein referred to is the 42-gallon barrel of the petroleum industry. The preferred air rate is between about 10 to 15 cubic feet per barrel per minute. The oxidation is performed under pressure which increases the oxidation rate and also limits excessive evaporation of the desired oxidation products, while allowing the evaporation of some of the lower molecular weight acidic oxidation products. The effect of oxidizing under pressure only increases the reaction rate and does not alter the product distribution or types of products providing the pressure is in the range of $2/10$ to 20 atmospheres. The volatilized lower molecular weight compounds may be subsequently recovered and purified according to conventional processes. The removal of the lower molecular weight acids appears to aid the oxidation. The effluent gases leaving the oxidizing vessel may be cooled so as to recover the lower molecular weight normally liquid oxidation products. These products include formic, acetic, and propionic acids and other oxygenated materials.

The oxidation operation, above described as a batch process conducted in a single vessel, may be conducted on a continuous basis in a series of smaller vertical reaction vessels, each equipped for heating and cooling and provided with means for introduction of the gas containing oxygen. The paraffin wax may be passed successively through the series of vessels to undergo oxidation. The advantages offered by such a mode of operation include among others a steady flow of product, a uniform product quality, and the ease of control of the operation.

Following the initiation of the oxidation reaction, less heat is required to maintain the desired temperature because of heat developed by the reaction. Thus, it is sometimes necessary to discontinue heating and remove heat by cooling the reactor to maintain the desired temperature. Whether the operation is carried out exothermically or endothermically is largely determined by the pressure of the operation, temperature, and the amount of air or other oxygen-containing gas employed in the reaction as well as the size of the oxidation vessel.

During the oxidation step, a considerable quantity of volatile low molecular weight oxidation products are recovered by cooling and separation from the accompanying water formed by the oxidation process. A separation of these materials is relatively simple and is carried out by conventional methods.

If the oxidation process is controlled within the temperature limits and the acid number range described hereinbefore, the oxidized wax product has a fairly definite composition and is relatively easily separated into its respective fractions. If the temperature of the oxidation is outside the upper specified limits, extensive decarboxylation and/or other degradation of the desired hydroxy acids and their estolides takes place, with the result that a more complex and less readily separable mixture is obtained. When the acid number is increased beyond the upper limit specified, an appreciable degradation of the alpha-hydroxy acid estolides content ensues attended by an increasing complexity of the oxidized wax mixture. When the acid number of the oxidized wax is below the lower limits specified, the amount of unreacted wax in the oxidized fraction is correspondingly increased, and such unreacted wax is relatively difficult to remove from the neutral by-products.

The oxidized wax is next preferably washed with water for the purpose of separating water-soluble components such as organic acids of the type of fatty acids, low molecular weight alpha-hydroxy acids and the like from the oxidized wax. The water washing process is preferably conducted at or near the boiling point of water and while the wax is in a melted condition. Under these conditions, the water washing is facilitated by the increased fluidity and mobility of the oxidized wax. It is generally desirable to use two or more washes with two to ten volumes of water per volume of oxidized wax per wash. The water washing may be performed at temperatures above the boiling point of water in which case a pressure is maintained in order to prevent evaporation of water. Any convenient apparatus may be used for the water washing, such as a series of mixing and settling vessels or a conventional extraction column. The water washing results in producing a water washed oxidized wax having an acid number of about 100 to 175 but generally when the unwashed oxidized wax has an acid number of about 200 to 250, the acid number of the resultant water-washed oxidized wax will be in the neighborhood of 150. This water-washed wax will contain oxygenated products ranging from 6 to 50 or more carbon atoms per molecule.

The separation of the alpha-hydroxy acids and/or estolides from the water-washed oxidized wax is next carried out in accordance with the following methods. A relatively simple method but in which a relatively impure fraction of alpha-hydroxy acids and/or estolides is separated, involves the extraction of the water washed oxidized wax with two to ten volumes of a non-polar solvent, preferably a low molecular weight hydrocarbon, such as propane, butane, pentane, hexane, heptane, octane, naphtha or light gasoline and the like. Extraction is preferably carried out at a temperature above the melting point of the water-washed wax. The extraction results in dissolving unreacted wax, fatty acids and neutral oxygenated bodies and rejecting hydrocarbon-insoluble components. These hydrocarbon-insoluble components comprise mostly a mixture of alpha-hydroxy acids and estolides, together with lesser amounts of contaminating fatty acids and neutral oxygenated compounds. The contaminants in the alpha-hydroxy acid-estolide mixture obtained by this procedure comprise approximately 20 to 25 mole per cent of the mixture. When the oxidation process is carried out under temperatures beyond the limits herein specified, the contamination of the alpha-hydroxy acid-estolide fraction with unreacted wax and/or decomposition products of alpha-hydroxy acids and estolides increases considerably.

The hydrocarbon-insoluble fraction comprises from 25 to 60% by weight of the original water-washed oxidized wax mixture. The hydrocarbon-insoluble fraction is separated and preferably is re-extracted one or more times with 1 to 10 volumes of the hydrocarbon solvent to remove residual hydrocarbon-soluble components. The hydrocarbon-insoluble material obtained thereby comprises a crude mixture of alpha-hydroxy acids and their estolides which contains about 75% by weight of alpha-hydroxy acids and estolides, about 5 to 10% by weight of fatty acids and about 5 to 15% by weight of neutral oxygenated esters. For some purposes, this crude reaction mixture is useful per se. For other purposes, however, the contaminating neutral oxygenated oil is very objectionable in that in certain reactions, such as polymerization and the like, it constitutes inert contaminants which dilute the reaction products and are difficult to remove from the reaction products if such removal is necessary. In other instances the presence of fatty acids may be similarly objectionable.

The hydrocarbon-insoluble fraction can be purified to some extent by solution in sodium hydroxide and extraction of the sodium hydroxide solution with additional hydrocarbon solvent. Such extractions often present serious emulsion problems and even in the absence of emulsion problems the transfer of the neutral oxygenated compounds to the hydrocarbon phase is incomplete. By extracting an alkali solution of the hydroxy acids with hydrocarbon, it is possible to raise the ultimate purity of the alpha-hydroxy acids-estolides to about 80 to 85%. Repeated extraction of the alkaline hydroxy acid solution does not increase its purity appreciably beyond the above limits.

A preferred method for the preparation and purification of alpha-hydroxy acids and/or estolides is based upon the fact that these compounds can be selectively separated from accompanying high molecular weight water-insoluble compounds occurring in water-washed oxidized wax by extraction of these mixtures with a solution of an alkali metal borate, such as sodium borate. The molten water-washed oxidized wax is preferably dispersed in a hydrocarbon solvent and subsequently extracted with the borax solution. Alternatively, however, the melted water-washed oxidized wax may be mixed first with the sodium borate solution and this mixture extracted with a hydrocarbon solvent. The former method has the advantage of improving the separation of the neutrals fraction from the alpha-hydroxy acid-estolide fraction, since the association of the neutrals with the alpha-hydroxy acids and/or estolides is minimized, thereby decreasing their solubility in the sodium borate phase.

The alternate method for forming the borate complex has the advantage of forming the complex in a relatively concentrated medium thereby obtaining a more rapid reaction in concentrated systems.

The use of sodium borate as an extractant for alpha-hydroxy acids and estolides, from water-washed oxidized wax has several advantages over other methods. The borax solutions are highly selective in that they only form complexes with the alpha-hydroxy acids and estolides. The remaining compounds are then readily extracted into the hydrocarbon phase. The aqueous solutions of borax and alpha-hydroxy acid-estolides have a pH of about 6.0. Under these conditions sensitive compounds in the oxidized wax are dissolved by the borax and recovered therefrom substantially unchanged. For example, the ratio of alpha-hydroxy acids to their estolides is substantially the same in the borax extractant as existed in the original oxidized wax. The borax solutions do not form stable emulsions with the nonpolar compounds present in the water-insoluble raffinate. This is most important since certain components of oxidized wax form emulsions which, in other processes, constitute a serious difficulty in effecting clean separations between the two phases. The separation of the aqueous and hydrocarbon phases is further facilitated by the high specific gravity of the borax solutions. Finally, the use of borax is economical and the recovery of the borax from the spent solutions can be made almost quantitative.

Independent of these several advantages of the borax method, the purity of the product from this process is outstanding. Such purity cannot as easily be attained by the use of any other process. The alpha-hydroxy acid-estolide fraction obtained therefrom is substantially free of both fatty acid and neutral oil contaminants. Moreover, the high purity of the product obtained with the borax process enables the maximum amount of byproducts to be recycled to the oxidation stage whereby a maximum yield of alpha-hydroxy acids and estolides is obtained.

Alpha-hydroxy acids and their estolides, such as are present in water-washed oxidized wax, are solubilized in an aqueous solution of borax or sodium tetraborate decahydrate. It is believed that a molceular complex is formed between the borax and the alpha-hydroxy acid-estolides, which complex is water-soluble and in some respects resembles organic soaps. The water-insoluble acids, which are not solubilized by the borax treatment, are soluble in nonpolar solvents such as petroleum naphtha, and are referred to herein as fatty acids and as naphtha-soluble acids. The alpha-hydroxy acids and/or their estolides are only slightly soluble in petroleum naphtha.

The alpha-hydroxy acid-borax soap complex, which is formed between the alpha-hydroxy acids and the borate ion of the borax solution, comprises about 3 moles of hydroxy acids per mole of borax. The exact nature of the molecular complex formed has not been accurately determined, but it is believed that the alpha-hydroxy group as well as the OH of the carboxyl group enter into the complex formation. The soap complex thus formed has been found to have a higher electrical conductivity than either the alpha-hydhoxy acid or the boric acid formed through hydrolysis of the borax in aqueous solution. The above is also true of the estolides.

In the preferred method of borax refining, the water-washed oxidized wax is heated to, or maintained at, a temperature above its melting point, for example, 5 to 50° C. above the melting point of the water washed oxidized wax, in order to liquefy the mixture and/or maintain it in a fluid condition. The water washed oxidized wax is then mixed with between 1 and 10, preferably about 3 volumes of a hydrocarbon solvent per volume of water-washed oxidized wax.

The hydrocarbon solvent may be any hydrocarbon which does not react with the oxidized wax fraction and which can be evaporated from the oxidized wax at a temperature below the decomposition temperature of the components of the oxidized wax. In general, any saturated hydrocarbon, or mixture thereof, which boils over the range of about −10 to +150° C. may be used. Preferably, such petroleum-derived fractions such as butanes, pentanes, hexanes, heptanes, benzene, toluene, naphtha or light gasoline and the like, may be used.

The hydrocarbon solvent-water washed oxidized wax mixture is then treated with a solution or slurry of sodium borate and water, which solution or slurry comprises about 4 to 50% by weight of sodium borate. In contact with the alpha-hydroxy acid-estolide mixture, the sodium borate and the alpha-hydroxy acids and estolides are solubilized in the aqueous phase. The mixture of hydrocarbon and oxidized wax is thoroughly contacted with the borate solution in order to form the borate complex. The amount of sodium borate in the slurry or solution is stoichiometrically equivalent to about 90 to 95% of the alpha-hydroxy acids and estolides present in the hydrocarbon-oxidate mixture. Separation of the two liquid phases produced by the borate treatment yields an equeous soap-complex phase containing the alpha-hydroxy acids and estolides solubilized therein by the borax, and a hydrocarbon phase containing the hydrocarbon-soluble acids.

The solubility of the borax, i. e., sodium borate or sodium tetraborate-decahydrate, in water at room temperature is about 4% by weight and the solubility is increased with increase in temperature. The borax used in forming the complexes may consist of a partially saturated solution of borax, a saturated solution of borax or an aqueous slurry of borax. The presence of alpha-hydroxy acids and/or estolides in a sodium borate-water system markedly increases the solubility of the sodium borate and concentrations of as high as 50 weight per cent sodium borate in water may be obtained even at room temperatures in the presence of added alpha-hydroxy acids and/or estolides. In certain instances, concentrations of sodium borate in the range of 4 to 50% by weight wherein the sodium borate is solubilized by the presence of alpha-hydroxy acids and/or estolides, may be employed as extraction solutions.

The hydrocarbon-soluble acids are somewhat soluble in the aqueous-complex phase and in order to avoid contamination of the alpha-hydroxy acids and/or estolides by hydrocarbon-soluble acids and neutrals, the amount of borax extractant used to contact the water-washed oxidate contains somewhat less than the theoretical quantity of borax required to convert all of the alpha-hydroxy acids and/or estolides present. The preferred amount of borax is about 90% to 95% of theoretical equivalent. In other words, the preferred quantity of borax as borax extractant solution is between about 0.90 and 0.95 mole of borax for every 3 moles of alpha-hydroxy acid and/or estolide.

The complex formation and extraction process is likewise carried out at temperatures of about 5 to 50° C. above the melting point of the oxidized wax and at atmospheric pressure, although pressures up to 10 atmospheres may be employed in order to make use of higher temperatures at which the rate of complex formation is more rapid.

In the alternative method, the water-washed oxidized wax is heated to and/or maintained at a temperature of about 5 to 50° C. above its melting point sufficient to maintain it in a fluid condition. The liquid mixture is then contacted with an aqueous borate solution or slurry which has a sodium borate content of between 4 and 50 per cent by weight. The oxidized wax is thoroughly mixed with the borate solution or slurry in order to form the borate complex. The amount of borax solution or slurry employed is equivalent to about 90% to 95% of the alpha-hydroxy acid and estolide present in the oxidized wax. As a result of the treatment with the borate solution, two liquid phases are obtained, one of which contains the alpha-hydroxy acid and estolide solubilized therein by the borax and the second liquid phase contains a hydrocarbon-soluble acid. In one modification, the two liquid phases are separated and the sodium borate phase is contacted with a hydrocarbon-solvent in order to dissolve the entrained hydrocarbon-soluble material and also to extract the hydrocarbon-soluble material solubilized in the sodium borate phase by the presence of the alpha-hydroxy acids and/or estolides. The hydrocarbon-washed sodium borate phase is separated, then processed to recover the alpha-hydroxy acids and/or estolides according to the methods described hereinafter. Preferably, the two liquid phases resulting from the borax treatment are not separated but are mixed with a hydrocarbon solvent. The hydrocarbon phase is thereafter separated from the borate solution and contains the naphtha-soluble acids and neutrals. This latter fraction is processed according to the methods hereinafter more fully described. The treatment and extraction of the two liquid phases obtained by treatment of the oxidized wax with sodium borate solution without separation of the two phases, permits an unusually sharp separation between the two phases, thereby increasing the separation of the naphtha-soluble acids and neutrals from the alpha-hydroxy acid and estolides fraction.

The extraction in either case is conveniently accomplished in an extraction column packed with suitable contact material such as rings, saddles, or the like. However, the extraction and phase separation can also be carried out in a series of mixing and settling vessels. In either case, approximately 1 to 10 volumes of the hydrocarbon solvent aforementioned, preferably 3 volumes per volume of water-washed oxidized wax is employed and the extraction is carried out at a temperature about 5 to 50° C. above the melting point of oxidized wax.

The success of the borax solvent extraction process employed in obtaining the borax soap complexes resides in the use of concentrated borax solution. For some reason, stable emulsions are not formed when aqueous borax solutions having more than about 4% by weight of borax are used. Solutions containing less than about 4% borax form very stable emulsions which are similar to those obtained when the separation of these acids is attempted with strongly alkaline solutions. It is for this reason that the limits of borax solution or slurry from about 5 to about 20 weight per cent or higher are preferred.

The hydrocarbon-insoluble aqueous soap-complex phase, which is separated during the extraction step, is heated to evaporate a small amount of dissolved hydrocarbon. The hydrocarbon-free soap complex is then treated with a mineral acid to decompose the soap complex with the subsequent formation of a free alpha-hydroxy acid-estolide phase. The resulting aqueous phase contains boric acid, any excess of mineral acid employed in the acidification step, and the sodium salts of the mineral acid. The preferred acid for the acidification step is sulfuric acid and preferably sulfuric acid having a concentration of about 40 to 50% by weight; however, virtually any concentration of any mineral acid may be used. The moderately concentrated acids are preferred because in subsequent purification operations less difficulty is encountered due to the excessive amounts of water of dilution which are present when more dilute acids are employed. The amount of acid required amounts to about 1 equivalent per equivalent of borax and is just sufficient to convert the borax present in the complex to boric acid. This amount will serve to decompose the soap complex completely and liberate the alpha-hydroxy acids and estolides held therein. If desired, however, an excess of acid may be employed, in which case boric acid is salted out as a crystalline phase and may be separated by filtration, reconverted to its sodium tetraborate salt, and reemployed in the process. It has been found that by employing an excess of 2 moles of sulfuric acid per mole of borax and evaporating from the aqueous phase about 50% of the water present, an 80% by weight recovery of crystalline boric acid may be effected.

The free alpha-hydroxy acid-estolide mixture formed by the acidification of the borate extract phase is water washed at a temperature of 30–100° C., preferably 50–75° C. with sufficient water to remove small amounts of residual mineral acid and water-soluble inorganic salts present therein. The water-washed material comprises a relatively pure mixture of alpha-hydroxy acids and estolides which are substantially free of unoxidized wax or other neutral materials, naphtha-soluble acids and/or other acidic contaminants. The alpha-hydroxy acid-estolide mixture is produced as a dark brown viscous liquid at room temperature and comprises compounds which have for the most part between about 6 and 50 carbon atoms per molecule.

The hydrocarbon phase which was separated from the borate extraction solution contains the hydrocarbon-soluble acids, unoxidized wax, neutral oxygenated materials, and a small amount of alpha-hydroxy acids and estolides. The separated hydrocarbon phase is re-contacted with additional quantities of the aqueous borax solution in an amount which is slightly in excess of that which is equivalent to the 5 to 10% of the original alpha-hydroxy acids and estolides which remain in the hydrocarbon phase. As has been previously described, the amount of borax employed in the first borate extraction step was only equivalent to between 90 and 95% of the alpha-hydroxy acids and estolides present therein. The purpose of the second extraction is to remove the residual alpha-hydroxy acids and estolides which are removed as an impure alpha-hydroxy acid-estolide borate complex, which mixture is contaminated with hydrocarbon-soluble acids and some neutrals. The second borate extraction solution can be acidified with a mineral acid as described above whereby an impure alpha-hydroxy acid estolide fraction is produced, or alternatively, the extract solution may be used as part of the borate extraction solution in the first borate extraction step, wherein the alpha-hydroxy acids and estolides in the second extract are purified by extraction with fresh water-washed oxidized wax and are ultimately recovered in relatively pure form from the first-stage extract solution as described hereinbefore. The contaminating neutrals and fatty acids are rejected into the hydrocarbon phase in the first extraction step and ultimately recovered in the hydrocarbon phase from the second borate extraction step, relatively free of alpha-hydroxy acids and estolides.

The hydrocarbon phase from the second borate extraction step is contacted with a dilute aqueous alkaline extractant containing a basically reacting alkali metal such as a bicarbonate, carbonate or hydroxide of an alkali metal in a packed extraction column, or in a series of mixing and settling vessels. This alkaline extractant preferably contains between about 1% and 10% by weight of an alkali metal carbonate. The extraction serves to form the alkali metal salts or soaps of the hydrocarbon-soluble acids thereby affording a means of separating these acids from the neutral materials, which are not extractable from the hydrocarbon phase under these conditions. Operational difficulties arising from the formation of stable emulsions are minimized by the use of dilute alkali metal salt solutions. If and when emulsions persist, alcohol may be added to the extraction or de-emulsifiers employed. The alkali metal carbonate solutions employed as extracting agents should preferably contain about 5% by weight of the alkali metal carbonate. Sodium or potassium carbonate are preferred, but carbonates of the other alkali metals may also be employed. The carbonate-extracted hydrocarbon phase comprises a hydrocarbon solution of neutral bodies and the aqueous carbonate phase contains the water-soluble alkali metal salts of the hydrocarbon-soluble acids.

The carbonate-extracted hydrocarbon phase is then distilled to recover the hydrocarbon solvent which is recycled to the hydrocarbon solution and/or extraction step. The bottoms material from the distillation comprises the neutral constituents consisting of unoxidized wax and neutral oxygenated compounds present in the crude oxidized wax. The neutral compounds, if desired, may be recycled to the oxidation step wherein they may be oxidized to form additional amounts of alpha-hydroxy acids and estolides and other acidic oxidation products. Alternatively, the neutrals may be produced as a distinct and useful by-product.

The aqueous carbonate phase is heated to remove a small amount of dissolved hydrocarbon and is then acidified with a strong mineral acid such as was described for the acidification of the borate extraction solution. The amount of mineral acid employed is sufficient to convert the alkali metal soaps of the hydrocarbon-soluble acids to the free hydrocarbon-soluble acids and the alkali metal salts of the mineral acid. A slight excess of acid is desirable. The alkali metal soaps of the hydrocarbon-soluble acids are thus decomposed and the free hydrocarbon-soluble acids are liberated as a water-insoluble phase. The aqueous phase contains any excess acid employed in the acidification together with the alkali metal salt of the mineral acid. The hydrocarbon-soluble acids liberated from their alkali metal salts are removed and extracted with water to remove excess mineral acid and entrained inorganic salts, whereby a light-colored semisolid mass of relatively pure hydrocarbon-soluble fatty acids having between about 6 and 40 carbon atoms per molecule is obtained.

A limited amount of hydrocarbon-soluble acids, particularly the lower molecular weight fatty acids, are dissolved in the borate extraction solution in the first borate extraction step. There is apparently no complex formation between these fatty acids and the borax and it is believed that they enter the borate phase by chemical association and orientation with molecules of the alpha-hydroxy acids and estolides which have formed complexes containing on the average a very small amount of fatty acids.

The borax extraction solutions employed in the process according to our invention for forming water-soluble molecular complexes with the alpha-hydroxy acids and estolides present in oxidized paraffin wax fractions is preferably sodium tetraborate decahydrate, also known as borax. However, other alkali metal tetraborates such as those of lithium, potassium, rubidium, and cesium are likewise applicable. In certain cases, it may be possible to employ the borates of the alkaline earth metals such as calcium, barium and strontium. However, these latter salts are not the preferred borates in view of their low water solubility.

The hydrocarbon-extracted aqueous borax soap solutions which have been previously described are ordinarily liquid at normal temperatures, that is, around room temperature. They are nonalkaline, having a pH less than 7 and have the properties of an excellent wetting agent. These soap complexes may be modified in concentration by either the removal or addition of quantities of water so as to form emulsifying, solutizing, and gelling agents.

In the initial performance of the borax separation process as herein described, 42% sulfuric acid was employed to decompose the borax soap complex and also the sodium soaps of the hydrocarbon-soluble acids. Our invention is not to be limited by the use of the particular concentration of this acid inasmuch as we have found that a wide range of concentrations of any mineral acid is applicable. Such mineral acids as hydrochloric, nitric, phosphoric, etc., may be employed.

Although the borax method is the preferred method for the separation of alpha-hydroxy acids and estolides from oxidized wax mixtures, other methods of separation disclosed hereinafter may also be used. For example, melted oxidized wax mixtures, of the types which are produced under the conditions described herein, exist as two distinct intimately-dispersed liquid phases. The separation of the two liquid phases during long standing in a melted state is incomplete and is of relatively little value. However, by centrifuging the melted oxidized wax, the two fractions can be separated. The denser phase contains the alpha-hydroxy acids and estolides together with most of the water-soluble lower molecular weight compounds, while the lighter phase contains the neutral oxygenated compounds, the fatty acids and the unreacted wax. Reasonably pure alpha-hydroxy acids and estolides may be obtained by water washing the melted denser phase to remove the water-soluble components therefrom. The centrifuging process may be improved by adding small amounts of a hydrocarbon solvent to the melted oxidized wax prior to centrifuging in order to decrease the density of the hydrocarbon-soluble phase and facilitate the phase separation during the centrifuging step. While the hydrocarbon solvent may be any paraffinic hydrocarbon which can be removed from the mixture by distillation, e. g., hexanes, heptanes, octanes, petroleum naphtha and the like, the use of paraffin wax itself is preferred because of its particular advantage that the paraffin-soluble phase may then be returned directly to the oxidizer for further oxidation. The solvent may be employed in any desired ratio and sharp separations are obtained when about 0.1 to 1.0 volumes of solvent per volume of water-washed oxidized wax are employed.

The water-washed oxidized wax can also be separated into its respective components either by fractional solution in sulfuric acid or by fractional precipitation from sulfuric acid. In the former, the water-washed oxidized wax is repeatedly contacted with progressively increasing concentrations of sulfuric acid, starting with about 65% sulfuric acid and finally extracting with about 95% acid. Under these conditions, it is found that the residual water-soluble components are the most soluble and are dissolved in the 65% acid. The alpha-hydroxy acids and estolides are soluble in the more concentrated acid and are dissolved by 70–75% acid. The fatty acids are dissolved in acid of about 80 to 90% concentration while the neutral oxygenated materials and unreacted wax are substantially insoluble in 90% sulfuric acid. The neutral oxygenated compounds are incompletely soluble in about 95% sulfuric acid.

The sulfuric acid fractionation process can also be reversed wherein the water washed oxidized wax is contacted with about 90–95% sulfuric acid in order to dissolve all of the oxidized wax mixture with the exception of part of the neutral oxygenated compounds and the unreacted wax. The addition of small amounts of water to the sulfuric acid-containing solution of the oxidized wax components progressively precipitates the less soluble components present in the acid. The neutral oxygenated compounds, the fatty acids and then the alpha-hydroxy acids and estolides can be successively precipitated by dilution of the acid.

The water washed oxidized wax can also be fractionated by partial solution in, or precipitation from, acetic acid in substantially the same manner as is employed for sulfuric acid.

The preferred method of separation using acetic acid employs water rejection or fractional precipitation wherein the major portion of the oxidized wax is first dissolved in concentrated acetic acid, and the oxidized wax fractions are separated therefrom by successive dilutions with water. The acetic acid process has an additional advantage in that a better separation of neutral oxygenated compounds is obtained. The addition of the acetic acid to the oxidized wax dissolves all but unreacted paraffin wax which is substantially insoluble in concentrated acetic acid mixtures, while the oxygenated neutrals, fatty acids, alpha-hydroxy acids and estolides are dissolved in the acetic acid. The latter solution is next diluted with incremental amounts of water sufficient to precipitate only the neutral oxygenated compounds which are separated from the remaining acetic acid solution. The addition of more water precipitates the fatty acids which are separated in turn, leaving the alpha-hydroxy acids and estolides in solution in the aqueous acetic acid which are precipitated by further addition of water and then separated from the dilute acetic acid. These may also be separated by distilling off the aqueous acetic acid.

Although acetic acid is the preferred acid for this purpose, other low molecular weight acids such as formic acid, propionic acid, butyric acid, isobutyric acid and the like may also be employed. Mixtures of these acids, such as are recovered from the condensed volatile material from the exit gas from the oxidation process itself, may also be employed.

Water-washed oxidized wax can also be resolved by selective adsorption on silica gel. Unreacted paraffin wax is but slightly adsorbed on silica gel; the neutral oxygenated compounds are adsorbed somewhat more strongly; the fatty acids are adsorbed still more strongly; and the alpha-hydroxy acids and estolides are the most strongly adsorbed compounds. Accordingly, the stage-wise treatment of oxidized wax with silica gel will remove the most strongly adsorbed fraction first, the next most strongly adsorbed fraction second, and so on. The silica gel containing the adsorbed oxidation products may be eluated with any of the commonly employed eluents such as methyl alcohol, ethyl alcohol, dioxane and the like.

Of the methods described above for the separation of alpha-hydroxy acids and estolides, the borate method permits a high purity of the alpha-hydroxy acid-estolide fraction obtained therefrom. These are relatively free of neutral oxygenated compounds which act as undesirable inert diluents in certain reactions such as esterification, polymerization and the like, to be described hereinafter.

Although the products from the borate refining method are very pure, it is apparent that substantially the same chemical compounds can be obtained in a less pure form from other processes. It is also apparent that the reactions of alpha-hydroxy acids and/or estolides are in themselves not dependent necessarily upon the method of separation and that only the quality of the product is involved in the choice of the method of refining. Thus, in the reactions to be described, water-insoluble alpha-hydroxy acids and/or estolides isolated from oxidized wax by any suitable process may be used in the broad application of the reactions.

The water-insoluble alpha-hydroxy acids which are present in oxidized paraffin wax oxidized according to the conditions described hereinbefore have a molecular structure which corresponds to:

(A)            R—CHOH—COOH wherein R represents a straight chain saturated aliphatic radical having at least 4 carbon atoms. The length of the carbon chain of the alpha-hydroxy acids obtained by these methods varies considerably with the nature of the oxidation. The major portion of the alpha-hydroxy acids, obtained from waxes oxidized according to the methods described herein, have a carbon chain which corresponds roughly to about 1 to 5 carbon atoms less than one-half of the number of carbon atoms in the original paraffin wax employed as the oxidation feed stock. Thus, the oxidation of a paraffinic petroleum wax having in the neighborhood of about 30 carbon atoms per molecule yields a mixture of alpha-hydroxy acids whose carbon chains vary from approximately 6 to 30 carbon atoms per molecule and average about 10 to 16 carbon atoms per molecule.

The length of the carbon chain of the alpha-hydroxy acid may be shortened by selecting a lower molecular weight paraffinic hydrocarbon for the oxidation feed stock. The carbon chain of the alpha-hydroxy acid can also be shortened by increasing the severity of the oxidation process such as by increasing the contact time of the oxygen containing gas with the feed stock, increasing the acid number of the oxidized wax, increasing the temperature of the oxidation and/or increasing the pressure of the oxidation process. Conversely, the length of the carbon chain of the alpha-hydroxy acid can be increased by selecting a higher molecular weight paraffin hydrocarbon for the oxidation feed stock and/or by decreasing the severity of the oxidation process.

The water-insoluble estolides of alpha-hydroxy acids, which are obtained by the oxidation of straight chain paraffinic hydrocarbons have a molecular construction corresponding to:

(B)           R—CHOH—COO—CHR'—COOH wherein R and R' represent substantially straight chain saturated aliphatic radicals, each of which contains at least about 4 carbon atoms. The carbon chains of the R and R' radicals respectively, may each vary independently of the other in the general range of about 4 to 50 carbon atoms and are usually of approximately equal length. The water-insoluble estolides themselves may contain between about 6 and 100 carbon atoms per molecule. However, the estolides mostly average about the same number of carbon atoms as the original paraffin wax used in the oxidation step. Accordingly, the estolides produced by the oxidation of a paraffinic hydrocarbon containing about 30 carbon atoms per molecule are predominantly those which contain about 25 to 30 carbon atoms per molecule.

The carbon chains of the estolides produced by the oxidation of paraffinic hydrocarbons may be shortened by selecting lower molecular weight paraffinic hydrocarbons for the oxidation feed stock and/or by increasing the severity of the oxidation process such as by increasing the contact time of the oxygen-containing gas with the hydrocarbon feed stock, increasing the acid number of the oxidized wax, increasing the temperature of the oxidation and/or by increasing the pressure of the oxidation process. Conversely, the length of the carbon chains of the estolide may be increased by selecting a higher molecular weight paraffinic hydrocarbon for the feed stock and/or by decreasing the severity of the oxidation process.

The molal ratio of estolides to alpha-hydroxy acids in the oxidized wax mixtures, produced according to the conditions and methods described herein, is usually in the neighborhood of about 70:30. Conditions which permit the escape of the water formed in the oxidation reaction from the reactor and which do not promote the formation of more water tend to increase the ratio of estolides to alpha-hydroxy acids. Under such conditions, the ratio of estolides to alpha-hydroxy acids may be as high as 95 to 5. Similarly, conditions which tend to accumulate and retain the water formed in the oxidation process within the reactor also tend to decrease the ratio of estolides to alpha-hydroxy acids in the product. Thus, the ratio may be as low as 50 to 50 under conditions which tend not to react the alpha-hydroxy acids to form estolides and/or promote the hydrolysis of the estolides.

The alpha-hydroxy acid-estolide mixture can be used directly in many reactions to obtain the derivatives of corresponding estolide, the mixed derivatives of estolides and alpha-hydroxy acids can be obtained by the use of alternative conditions. For some purposes it is necessary and desirable to prepare the pure estolides from the mixtures. In other cases it is desirable to prepare the pure alpha-hydroxy acids from the mixture either obtained directly from the oxidized wax or from other mixtures containing alpha-hydroxy acids and estolides.

It has been found that alpha-hydroxy acids in a relatively pure form can be prepared by the saponification and careful acidification of the saponified mixture. The conversion of estolides to alpha-hydroxy acids is accomplished by the following series of reactions:

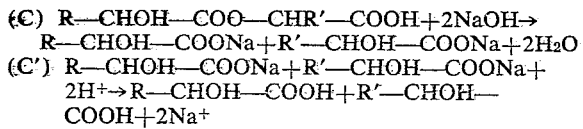

The saponification may be carried out in the presence of a low molecular weight solvent such as methyl alcohol, ethyl alcohol, isopropyl alcohol, propyl alcohol, acetone, dioxane, ethylene glycol, and the like. The solvent performs the function of solubilizing the estolides in the aqueous phase thereby facilitating their saponification. The solvent also tends to control the reaction temperature within the desired range.

The saponification of estolides to form the alpha-hydroxy acids is preferably carried out at a temperature in the range of 50 to 150° C. and preferably in the range of 75 to 125° C. At temperatures below the limit specified, the reaction is slow and does not proceed to completion in a reasonable period of time. At temperatures above the limit specified, the reaction is rapid but is accompanied by side reactions leading to the formation of undesirable products and contaminants which are difficult to remove from the otherwise relatively pure acids. The reaction may be carried out under pressure to permit the use of a lower molecular weight solvent at higher temperatures, in order to both solubilize the estolides in the aqueous alkali phase and also to accelerate the reaction by the use of higher temperatures. Thus, the saponification may be carried out at any pressure between about 1 atmosphere and 15 atmospheres.

In the saponification step any strong alkali may be used which does not form insoluble precipitates with the other reaction components. Suitable alkalis include the alkali metal hydroxides. Sodium and potassium hydroxides are the preferred saponification agents.

The amount of alkali employed may vary from the amount which is stoichiometrically equivalent to the combined alpha-hydroxy acids which are to be formed and plus present to seven times the equivalent amount. The preferred amount of alkali is in the range of 1.5 to 3.5 times the theoretical equivalent amount.

The acidification of the saponified estolides and/or alpha-hydroxy acid-estolide mixture is the critical step in the production of relatively pure alpha-hydroxy acids from their estolides. The formation of estolides from alpha-hydroxy acids is promoted by the addition of strong mineral and organic acids, such as hydrochloric, sulfuric, phosphoric, benzene sulfonic, toluene sulfonic, naphthalene sulfonic, fluoro sulfonic, and the like. These catalyze the partial conversion of pure alpha-hydroxy acids to their estolides. Accordingly, when the saponified estolide mixture is acidified to form the free alpha-hydroxy acids, the presence of a local excess of a strong mineral acid should be avoided since this is generally sufficient to promote the partial reversion of the alpha-hydroxy acids to their estolides. In order to avoid local concentrations of acid in the mixture, the soaps should be first diluted with about 3 or 4 volumes of water and then the acid is added gradually while stirring the mixture. The temperature of the mixture during the addition of the acid is maintained relatively low, i. e., about 20 to 50° C. Diluted acid should be used, for example, 1–6 normal sulfuric acid, to maintain a pH of greater than 3.

The acidification of the saponified estolide mixture causes the relatively pure alpha-hydroxy acids to separate as a water-insoluble phase. This phase is separated as soon as possible from the aqueous acids in order to prevent reversion of the alpha-hydroxy acids to estolides. The separated phase is next water washed and dried. Under optimum conditions such as have been disclosed herein, alpha-hydroxy acid fractions containing between 85 and 95 mole per cent of alpha-hydroxy acid and 15 to 5 mole per cent of estolides have been prepared. Alpha-hydroxy acids prepared according to the method described herein from their estolides, when suitably freed from any mineral acid catalyst and thoroughly dried, are quite stable with respect to reversion to their estolides and as such may be stored for periods up to six months without appreciable change. However, the presence of traces of acid causes a partial reversion of the alpha-hydroxy acids leading ultimately to mixtures containing in the neighborhood of only 25 to 50 mole per cent of alpha-hydroxy acids and 50 to 75 mole per cent of estolides.

The alpha-hydroxy acid fraction as produced from the saponification of estolides is generally contaminated with from 5 to 10% by weight of dissolved and/or entrained water. The removal of this water without contamination, excessive loss and/or chemical reaction and change is, itself, something of a problem. Drying is accomplished by distillation, preferably in the presence of an inert nonpolar solvent which acts as an entrainer to azeotrope the water overhead from the distillation vessel. The azeotrope is condensed and the water may be separated therefrom as a separate phase which may be removed. Suitable solvent-entrainers for this purpose include those petroleum fractions whose boiling point at atmospheric pressure is between 30 and 120° C. Suitable hydrocarbon solvent entrainers for the removal of water include any and all of the lower paraffinic naphthenic and aromatic hydrocarbons such as pentane, hexane, octane, benzene, toluene, xylene, cyclohexane, methylcyclohexane, straight run fractions and naphthas from gasoline and the like.

The reaction of alpha-hydroxy acids to form their estolides is a very rapid reaction and is estimated to proceed approximately at 20 times the rate at which the dehydroxylation of the estolide takes place which occurs to some extent during the reaction. The formation of estolides proceeds according to the following reaction:

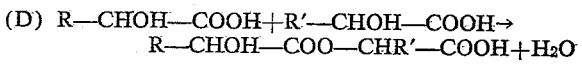

The reaction of alpha-hydroxy acids to form their estolides is catalyzed by the presence of acid catalysts including benzene sulfonic acid, toluene sulfonic acid, naphthalene sulfonic acid, sulfuric acid, chlorosulfonic acid, boric acid, phosphoric acid and the like. These catalysts accelerate the formation of the estolide when they are added to the reaction in amounts between 1/10 and 10% by weight of the acid based on the alpha-hydroxy acid to be converted. The amount of acid catalysts used is primarily determined by the economics of the reaction and amounts other than those specified may be used if desired.

Water is formed as a result of the estolide formation and, if not removed, the formation of the estolide usually proceeds to about 75 mole per cent estolide and 25 mole per cent alpha-hydroxy acids. The reaction proceeds no further unless the water is removed. It has been found that hydrocarbon entrainers of the type described above may be advantageously employed to azeotrope the water from the reaction mixture whereby a distillate is obtained which separates on cooling into two liquid phases, one of which is substantially pure water. The water is removed from the cooled distillate and the hydrocarbon entrainer returned to the reaction mixture. By this method and under suitable temperature control it has been possible to obtain approximately 100% conversion of the alpha-hydroxy acid to the estolide, with a minimum of side reactions leading to by-products which are difficultly separable from the desired estolide. Suitable hydrocarbon solvents for use as entrainers include the lower paraffinic naphthenic and aromatic hydrocarbons such as pentane, hexane, heptane, octane, cyclohexane, methyl cyclohexane, benzene, toluene, xylene, petroleum naphtha and the like.

Of the aforementioned hydrocarbon entrainers the aromatics are preferred since in general the reaction mixtures are more soluble in the aromatic hydrocarbons. Relatively close control of the estolide-forming reaction is necessary in order to obtain the desired estolide product free from contaminants. It is desirable to conduct the reaction under conditions which effect a rapid conversion of the alpha-hydroxy acids. However, excessively high temperatures promote the dehydroxylation of the desired estolide and sometimes the dehydroxylation of the alpha-hydroxy acid starting material takes place. Furthermore, higher temperatures and the presence of acid catalysts favor the polymerization of the dehydroxylated estolides and alpha-hydroxy acids whereby still more difficultly removable products are obtained.

The reaction to form estolides may take place catalytically or thermally if desired. The catalytic reaction takes place faster and at lower temperatures. With the thermal reaction there is less dehydroxylation and it is not necessary to provide a means for removing a catalyst from the product.

The catalytic reaction to form estolides is most advantageously carried out in the temperature range of 50 to 100° C., and preferably in the temperature range of 60 to 90° C. Under these conditions the reaction is both rapid and selective with respect to minimizing the dehydroxylation of the feed and product. The reaction is equally applicable to pure alpha-hydroxy acids and to mixtures of alpha-hydroxy acids and estolides. In the application of the catalytic reaction, the mixture containing the alpha-hydroxy acids is mixed with between 1/10 and 10 per cent by weight of an acid catalyst and with between 10 and 1,000 per cent by weight of a hydrocarbon entrainer. The mixture is refluxed at a temperature between 50 and 100° C. and preferably between 60 and 90° C. until an amount of water has been separated from the distillate which is equivalent to the amount of water formed in the theoretical complete conversion of the alpha-hydroxy acids to their estolides. The reaction under these conditions is generally complete in from 1 to 10 hours. When the reaction is carried out under these conditions, the side reactions leading to dehydroxylation and subsequent polymerization of the dehydroxylated product are generally limited to less than 10%.

Catalysts which may be employed in the foregoing reaction are acids such as benzene sulfonic, toluene sulfonic, naphthalene sulfonic, sulfuric, chlorosulfonic, boric, phosphoric, and the like.

The non-catalytic reaction to form estolides from alpha-hydroxy acids is effected in much the same fashion as the catalytic reaction with the exception that higher temperatures must be employed. The alpha-hydroxy acids and/or mixtures of alpha-hydroxy acids and their estolides are mixed with about 10 to 1,000 per cent by weight of the hydrocarbon entrainer described above and refluxed at a temperature in the range of 100 to 150° C., and preferably in the range of 115 to 135° C. for a period of time until the theoretical amount of water for the complete conversion of the alpha-hydroxy acids to their estolides has been removed from the distillate. The reaction is generally completed in from 5 to 50 hours of refluxing. The product of the reaction when carried out under these conditions is substantially pure estolide and is relatively free of dehydroxylated estolide and/or polymers thereof. Both the catalytic and non-catalytic formation of estolides may be carried out under any pressure in the presence of a hydrocarbon entrainer commensurate with the temperature limits hereinbefore specified.

The estolides or alpha-hydroxy acids or mixtures thereof may be esterified according to the following description to produce such compounds as the esters of the estolides, the esters of alpha-hydroxy acids or the mixed esters of estolides and alpha-hydroxy acids.

The estolides of the alpha-hydroxy acids can be esterified to yield substantially pure esters of the estolide providing suitable conditions are chosen which minimize the dehydroxylation of the estolides and/or the esters of the estolides. The esterification of estolides takes place according to the following reaction:

(E)
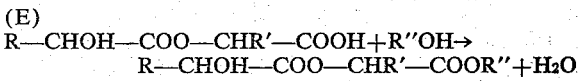

The esters of the estolides are most readily prepared by esterifying the pure estolide itself. However, under properly chosen conditions, it is possible to esterify pure alpha-hydroxy acids and/or mixtures of alpha-hydroxy acids and estolides in such a manner as to obtain the ester of the estolide as the principal product therefrom. The direct formation of an ester of an estolide by the reaction of an alcohol and an alpha-hydroxy acid takes place according to the following reaction:

(F)
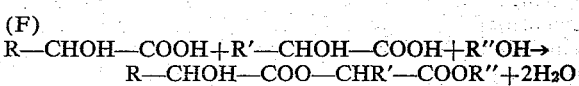

In the usual esterification of an estolide with an alcohol, approximately equivalent quantities of each reactant are used. However, under certain conditions quantities of reactants other than the equivalent amounts may be employed to produce esterified estolides containing an excess of either of the reactants. In the case of the lower alcohols, the excess alcohol is removable by distillation.

In the combined estolide-forming and estolide-esterification reaction of alpha-hydroxy acids, it is necessary to use approximately theoretically equivalent quantities of alpha-hydroxy acids and the alcohol to form the ester of the estolide. Thus, two mols of alpha-hydroxy acids would be required per mole of a mono-hydroxy alcohol; four moles of alpha-hydroxy acids would be required per mole of di-hydroxy alcohol and so forth. If the ratio of moles of alpha-hydroxy acid per mole of hydroxyl group is decreased appreciably below 1.5 and especially below 1.0, the product will contain appreciable amounts of the ester of the alpha-hydroxy acid itself. If the ratio of the moles of alpha-hydroxy acids to the moles of hydroxyl group is between 0.2 and 1.0, the principal reaction of the alpha-hydroxy acids and the alcohol results in the formation of the ester of the alpha-hydroxy acid itself rather than the ester of the estolide.

The esterification of estolides, the esterification of alpha-hydroxy acids, the simultaneous estolide formation and esterification reaction of alpha-hydroxy acids may each be carried out either thermally or catalytically. The catalytic reaction employs lower temperatures and takes place at a more rapid rate. The thermal reaction has the advantage of not promoting the dehydroxylation and it is not necessary to remove the catalyst from the thermally esterified products. The esterification reaction is rapid and proceeds at approximately the same rate as the estolide formation and at about 20 times the rate of the dehydroxylation reaction.

In the foregoing esterification reactions, water is liberated which must be removed from the reaction system in order to drive the reaction to completion. Solvent entrainers are advantageously employed for this process. Suitable solvent entrainers include all of the lower paraffinic, naphthenic and aromatic hydrocarbons such as pentane, hexane, heptane, octane, benzene, toluene, xylene, petroleum naphtha and the like.

Of the aforementioned hydrocarbon solvent entrainers the aromatic hydrocarbons are preferred since the reaction mixtures are generally more soluble in the aromatic hydrocarbons. The solvent entrainer under the refluxing conditions forms an azeotrope with the water and when the distillate is condensed it separates into two liquid phases, one of which is substantially pure water. The water is separated from the condensed distillate and the hydrocarbon entrainer phase is returned to the reaction system.

The esterification of estolides, the esterification of alpha-hydroxy acids, and the combined estolide formation and esterification of alpha-hydroxy acids are reactions which are catalyzed by acid catalysts such as benzene sulfonic acid, toluene sulfonic acid, naphthalene sulfonic acid, sulfuric acid, chlorosulfonic acid, boric acid, phosphoric acid and the like. The catalyst is conveniently employed in an amount of $1/10$ to 10% by weight of the alpha-hydroxy acid and/or estolide in the reaction charge. However, other amounts of catalyst may be employed depending upon the economics of the particular situation.

The reactions leading to esterified estolides and/or alpha-hydroxy acids may be carried out under any pressure and with any hydrocarbon entrainer commensurate with the temperature limits hereinbefore specified.

In the esterification of estolides approximately equivalent quantities of the alcohol and estolide are mixed with from 10 to 1,000 per cent of hydrocarbon entrainer based on the estolide, together with $1/10$ to 10 per cent by weight of the catalyst such as has been described hereinbefore. The mixture is refluxed until the theoretical quantity of water for the formation of the ester of the estolide has been removed from the distillate. The reaction is generally completed in about 1 to 10 hours. The product comprises substantially pure ester of the estolide. Quantities of alcohol and estolide other than equivalent quantities may also be employed such as between 0.5 and 1.5 equivalents of alcohol per equivalent of estolide. In this case, the product will contain the excess starting material.

The esterification of alpha-hydroxy acids wherein the principal reaction product consists of the ester of the estolide derived from the alpha-hydroxy acids is carried out by refluxing about 2 moles of alpha-hydroxy acid with 1 mole of hydroxyl group (1 mole of a mono-functional alcohol, ½ mole of di-functional alcohol, etc.), 10 to 1,000 per cent by weight of a hydrocarbon entrainer and $1/10$ to 10 per cent by weight of an acid catalyst based on the weight of the alpha-hydroxy acids. The mixture is refluxed at a temperature between 50 and 100° C. and preferably between 60 and 90° C. until the theoretical amount of water for the estolide formation and subsequent esterification has been separated from the distillate. The reaction is generally completed in about 1 to 10 hours. The product of the reaction is substantially the pure ester of the estolide.

Where mixed esters of estolides and alpha-hydroxy acids are desired a ratio of moles of alpha-hydroxy acids to moles of hydroxyl groups ranging from 0.5 to 1.5 may be employed. When ratios in the range of 1.5 and higher are used, the principal product of the reaction is the ester of the estolide. With ratios of less than 0.5, the principal product of the reaction is the ester of the free alpha-hydroxy acid. The mole ratio of alpha-hydroxy acid to hydroxyl group for the preferential production of esters of alpha-hydroxy acids is preferably about 0.2.

The non-catalytic esterification of estolides and/or alpha-hydroxy acids yields substantially the same products as the catalytic reaction, which products are primarily dependent upon the amount of alpha-hydroxy acid and/or estolide used as compared with the amount of alcohol present as is the case with the catalytic reaction.

In the non-catalytic esterification of estolides, the estolide is mixed with from 10 to 1,000 per cent by weight of a hydrocarbon entrainer and refluxed at a temperature of 100 to 150° C., and preferably in the range of 115 to 135° C. until the theoretical amount of water for the complete esterification of the estolide has been removed from the distillate. The product of the reaction is substantially the pure ester of the estolide.

In the non-catalytic preparation of esters of estolides from alpha-hydroxy acids, the alpha-hydroxy acids are mixed with an amount of alcohol sufficient to form a mixture containing in excess of 1.5 moles of alpha-hydroxy acid per mole of hydroxyl grouping. When a ratio of approximately 2.0 is employed, the reaction proceeds to the production of practically pure ester of the estolide and when ratios in excess of 1.5, but different from 2.0, are employed the product ester of the estolide will contain whichever reactant has been employed in excess.

In the thermal esterification of alpha-hydroxy acids to produce the ester of the alpha-hydroxy acid, the alpha-hydroxy fraction is mixed with an amount of alcohol sufficient to give a mole ratio of alpha-hydroxy acids to moles of hydroxyl groups of less than 0.5, and preferably in the range of 0.2. Under these conditions, the principal product of the reaction is the ester of the alpha-hydroxy acid in the excess alcohol. When a ratio of 0.5 to about 1.5 is used the product consists of a mixture of the esters of the alpha-hydroxy acids and the esters of the estolides. The esters of the alpha-hydroxy acids may be dehydroxylated in accordance with dehydroxylation methods disclosed herein to produce esters of high molecular weight acrylic acids.

The estolides of alpha-hydroxy acids, the alpha-hydroxy acids, the esters of estolides and the esters of alpha-hydroxy acids can be converted to the dehydroxylated estolides, the esters of dehydroxylated estolides and the esters of acrylic acid according to the following description:

The estolides of alpha-hydroxy acids can be converted to the dehydroxylated estolides, i. e., unsaturated estolides, according to the following reaction:

(G)

R—CH₂—CHOH—COO—CHR'—COOH→
    R—CH=CH—COO—CHR'—COOH+H₂O

The alpha-hydroxy acids themselves can be converted to unsaturated estolides by simultaneous or step-wise estolide formation and subsequent dehydroxylation according to the following reaction:

(H)

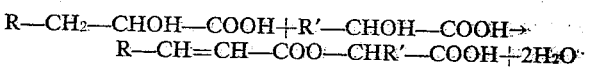

R—CH₂—CHOH—COOH+R'—CHOH—COOH→
    R—CH=CH—COO—CHR'—COOH+2H₂O

The esters of estolides can be converted to the esters of dehydroxylated estolides according to the following reaction:

(I) R—CH₂—CHOH—COO—CHR'—COOR"→
    R—CH=CH—COO—CHR'—COOR"+H₂O

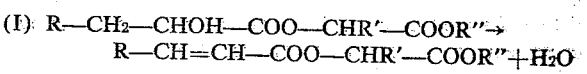

The esters of alpha-hydroxy acids can be converted to esters of acrylic acid according to the following reaction:

(J) R—CH₂—CHOH—COOR"→
    R—CH=CH—COOR"+H₂O

In the foregoing reactions, R and R' are saturated aliphatic radicals, generally straight chain but may be iso-paraffinic radicals wherein R and R' may each vary independently from about 4 to 50 carbon atoms. R" may be any alkyl or aryl or substituted alkyl or aryl radical having about 1 to 25 carbon atoms.

The foregoing reactions are comparable and are carried out under substantially identical physical and chemical conditions. These reactions may be carried out either in the presence or absence of a catalyst. The catalytic reaction is preferred since it is completed at lower temperatures with the selective production of the desired dehydroxylated compounds and with a minimum of side reactions which would result in the production of polymers of the dehydroxylated compounds.

The dehydroxylation reaction liberates water and is conveniently carried out in the presence of a hydrocarbon solvent entrainer. The solvent entrainer serves to control the reaction within desirable temperature limits and provides a solvent medium for the dehydroxylated compounds which assists in preventing premature polymerization of the dehydroxylated compounds and/or the production of undesirable hydrocarbon-insoluble products. The solvent entrainer may be any of the lower paraffinic, naphthenic or aromatic hydrocarbons such as pentane, hexane, heptane, octane, benzene, toluene, xylene, petroleum naphtha and the like.

Of the aforementioned hydrocarbon solvents the aromatic solvents are preferred since the reaction mixture is in general more soluble in aromatic hydrocarbons than in non-aromatic hydrocarbons. The reaction may be carried out under pressure with any of the aforementioned hydrocarbon solvent entrainers providing the reaction pressure is controlled to maintain the reaction system within the temperature ranges hereinafter described.

The reaction leading to the dehydroxylation of the aforementioned compounds is a relatively slow reaction and proceeds best in the presence of a catalyst. Suitable catalysts for the dehydroxylation reaction include such acid catalysts as benzene sulfonic acid, toluene sulfonic acid, sulfuric acid, chlorosulfonic acid, boric acid, phosphoric acid and the like. The use of solvents and close control of the temperature is important in the dehydroxylation reaction in order to prevent a premature formation of polymers whose formation causes the reaction system to gel, thereby preventing further dehydroxylation and/or other accompanying reactions.

The catalytic dehydroxylation reactions are best carried out in the temperature range of 100 to 150° C. and preferably in the temperature range of 115 to 135° C. The compound to be dehydroxylated is mixed with between 10 and 1,000 per cent by weight of a hydrocarbon entrainer, 1/10 to 10 per cent by weight of an acid catalyst and refluxed at a temperature of 100 to 150° C., and preferably in the range of 115 to 135° C. until the theoretical amount of water corresponding to the desired degree of dehydroxylation has been obtained. The dehydroxylation reaction is generally completed in about 15 to 60 hours of refluxing and the practically pure dehydroxylated compound is obtained therefrom.

The dehydroxylated products from estolides and alpha-hydroxy acids have structures which correspond to the esters derived from a high molecular acrylic acid and an alpha-hydroxy acid. The dehydroxylated product from an ester of an estolide has a structure corresponding to acrylic acid and an alpha-hydroxy acid, which combination is in turn esterified with an alcohol, whereas the dehydroxylated product from an ester of an alpha-hydroxy acid has a structure corresponding to an ester of a high molecular weight acrylic acid.

The dehydroxylation of esters of mono-functional alcohols with estolides may be brought about to obtain substantially pure dehydroxylated esters of estolides under the conditions described herein. The dehydroxylation of esters of estolides with polyfunctional alcohols becomes more difficult to complete and, in general, the reaction will be stopped short of completion due to the gelation of the product. It is not quite clear what produces the gelation of the dehydroxylation reaction mixture, but it is believed that the dehydroxylated esters of poly-functional alcohols and estolides are relatively sensitive to cross-polymerization among the olefinic bonds. High molecular weight hydrocarbon-soluble materials are rapidly formed as a result and ultimately separate from the reaction system as a gel.

The non-catalytic thermal dehydroxylation of estolides and esters of estolides is carried out by mixing the estolide or ester of an estolide with 10 to 1,000 per cent by weight of a hydrocarbon entrainer and refluxing the mixture at a temperature of 150 to 200° C. and preferably in the range of 165 to 185° C. The refluxing of the mixture is continued until the desired degree of dehydroxylation is indicated by the amount of water separated from the overhead distillate, or until the reaction has been completed as indicated by the water separated from the overhead distillate. The reaction is either completed or gelled in about 40 to 70 hours.

The conditions which promote the dehydroxylation of estolides is also conducive to the rapid conversion of alpha-hydroxy acids to estolides. Accordingly, the dehydroxylated estolide may be synthesized directly from the alpha-hydroxy acids and/or mixtures of alpha-hydroxy acids and estolides whereby substantially a pure dehydroxylated estolide may be obtained. The opimum conditions for the simultaneous estolide formation and dehydroxylation thereof are practically identical to the conditions described hereinbefore for the dehydroxylation of the tstolide itself. As with the dehydroxylation of the estolide, the combined formation and dehydroxylation reaction may be carried out either catalytically or non-catalytically and under the conditions described hereinbefore for simple dehydroxylation. The catalytic reaction employs lower temperatures.

The thermal reactions do not necessitate the removal of a catalyst from the product and the product is generally less contaminated with polymers as compared with the catalytic product.

The conditions which promote the dehydroxylation of esters of estolides are also conducive to the esterification of the estolides. Accordingly, the esterification and dehydroxylation steps may be combined into a single operation wherein an estolide is reacted with an alcohol and the ester formed thereby is concurrently dehydroxylated to form the unsaturated ester of the estolide. Conditions which are favorable to combined esterification and dehydroxylation are practically identical to the conditions described hereinbefore for simple dehydroxylation. The reaction may be carried out either catalytically or non-catalytically and with the catalytic reaction, lower temperatures may be employed.

Alternatively, the formation of the estolide, the esterification of the estolide, and the dehydroxylation of the ester may be combined into a single operation wherein an alpha-hydroxy acid and an alcohol are reacted to produce a final product consisting of substantially pure dehydroxylated ester of the estolide. The conditions for this single step process are substantially the same as have been described hereinbefore for the simple dehydroxylation reaction. The reaction may be carried out either catalytically or non-catalytically and again in the catalytic reaction lower temperatures may be employed.

The high molecular weight esters of unsaturated estolides with poly-functional alcohols can be prepared by a number of reactions. In one of these reactions, the estolides are simultaneously esterified and dehydroxylated to form the unsaturated estolide ester. In another reaction, the estolide is first esterified with the poly-functional alcohol and subsequently dehydroxylated to produce the unsaturated estolide ester. In another reaction, the estolide is first dehydroxylated to form the unsaturated estolide which is subsequently esterified with the poly-functional alcohol to yield the unsaturated estolide ester. In the foregoing reactions, similar results are obtained by substituting the alpha-hydroxy acids in the place of the estolides.

The simultaneous esterification and dehydroxylation of estolides with poly-functional alcohols is conducted under the general conditions outlined hereinbefore. However, with the poly-functional alcohols such as glycerol, sorbitol, pentaerythritol and the like, gelation of the reaction mixture generally occurs before the reaction has been completed. The gelation prevents further reaction and also renders the product insoluble in such solvents as toluene, xylene, turpentine and the like. The dehydroxylated ester present in the incompletely reacted mixture presumably is polymerized through its double bonds in such a manner that high molecular weight cross-linked polymers are formed. Cross-linked polymers of this type are relatively insoluble in the aforementioned solvents. In some cases, depending upon the use of the resulting product, such polymers are desirable and form part of our invention.

However, the simultaneous esterification and dehydroxylation of estolides may be carried out in the presence of an added non-gelation agent, which agent serves to delay the gelation of the reaction mixture until the dehydroxylation reaction has been substantially completed. Certain of the non-gelation agents are organic acids, the use of which not only prevents gelation of the reaction mixture, but also modifies the resulting product since the acid can be coesterified along with the estolide by the poly-functional alcohol.

Suitable non-gelation agents are such organic acids as those which contain a conjugated diene grouping and which can enter into the coesterification reaction. These include linoleic acid, linolenic acid, acrylic acid, methacrylic acid, abietic acid and the like. However, non-gelation agents, which are not acidic, may also be used. These include turpentine, styrene, alpha-methyl styrene, isoprene, butadiene, pentadiene, cyclopentadiene, esters of linoleic acid, esters of linolenic acid, esters of abietic acid, esters of acrylic acid, esters of methacrylic acid, acrylonitrile and the like.

The added agent may be employed for primary purpose of preventing gelation and in these instances the amount of non-gelation agent is employed which corresponds to about 0.05 to 0.5, preferably between about 0.1 and 0.3 moles of added agent per mole of alpha-hydroxy acid and/or estolide. When the added agent is selected from the aforementioned non-acidic group, an amount of poly-functional alcohol is employed which is stoichiometrically equivalent to the amount of estolide which is employed and/or which is formed from the alpha-hydroxy acids during the esterification. When the non-gelation agent is selected from the group of acids mentioned hereinbefore, an amount of poly-functional alcohol is employed which may be the stoichiometric equivalent for the complete esterification of the estolides and estolides formed in the reaction, and also for the added acidic non-gelation agent. Although it is desirable to use an amount of poly-functional alcohol sufficient to esterify the total organic acid content, this is not necessary since amounts other than the equivalent may be used if desired to produce an acidic or alcoholic product as the case may be.

In the esterification-dehydroxylaton reaction of estolides and/or alpha-hydroxy acids with poly-functional alcohols in the presence of a non-gelation agent, the added agent is mixed with the estolides and/or alpha-hydroxy acids and the desired alcohol and the whole mixture is heated, if in the absence of a catalyst, to about 175 to 225° C., and preferably to about 190 to 210° C. and in the presence of an added hydrocarbon entrainer as described above, until the reaction has been completed. The reaction is usually complete in about 5 to 50 hours. Under these conditions the reaction is both rapid and free from excessive polymerization of the reaction product. The reaction may also be carried out in the presence of a catalyst by the addition of $\frac{1}{10}$ to 5 per cent by weight based on the weight of the reactants of a dehydroxylation catalyst of the class described hereinbefore, and maintaining the reaction mixture at a temperature from 125 to 175° C., preferably between about 140 to 160° C., for about 5 to 50 hours, during which time the dehydroxylation is completed and the esterification is at least about 75% completed.

The non-gelation agents described hereinbefore may also be used to produce modified esters of dehydroxylated estolides by increasing the mole ratio of the added non-gelation agent to the estolides which are present in the reaction mixture. Thus, when the ratio of the moles of non-gelation agent to estolides is in the range of 0.5 to 20 and preferably in the range of 2 to 10, the reaction can be carried out with freedom from gelling of the reaction mixture such that the dehydroxylation reaction is completed and the esterification reaction is mostly completed. Under these conditions, the non-gelation agent combines with the dehydroxylated product to form derivatives thereof, which derivatives are in themselves distinct and useful compositions, particularly as substitutes for drying oils in that they themselves exhibit unusual drying properties. In the preparation of modified esters of unsaturated estolides, the conditions which are employed are substantially the same as those which have been described hereinbefore for the use of the non-gelation agents in smaller amounts as non-gelation agents for the simultaneous esterification and dehydroxylation reaction. If desired, the amount of poly-functional alcohol employed in the preparation of modified esters of unsaturated estolides may be the stoichiometrical equivalent of the total organic acid content of the system, in which case a neutral product is obtained. Alternatively, the alcohol may be employed in amounts which are either less than or greater than this amount in which case the excess component is incompletely esterified.

Under esterification-dehydroxylation reaction conditions, the formation of estolides from the free alpha-hydroxy acids is rapid and presumably precedes any other reaction. Accordingly, the poly-functional alcohol may be esterified with alphia-hydroxy acids and/or estolides with the result that an ester of the poly-functional alcohol with the estolide derived from the alpha-hydroxy acid is obtained. Thus, the reaction product of a poly-functional alcohol with an equivalent amount of alpha-hydroxy acids would comprise essentially the ester of the poly-functional alcohol and the estolide derived from the alpha-hydroxy acids. The presence of the aforementioned non-gelation agents in amounts which serve to prevent gelation as well as in amounts which serve both to prevent gelation and also modify the ester does not appear to alter the course of the estolide formation. The products which are obtained from either estolides or alpha-hydroxy acids, or mixture thereof, are equally useful as drying oils and in linoleum cementing preparations.

The high molecular weight esters of unsaturated estolides and poly-functional alcohols can also be prepared by esterification of the estolides followed by dehydroxylation of the ester of the estolide. The ester of the estolide can be prepared by esterification from either estolides and/or alpha-hydroxy acids as described above. The dehydroxylation of the ester is carried out either catalytically or non-catalytically as has been described previously. However, with esters of such poly-functional alcohols as glycerol, sorbitol, pentaerythritol, the dehydroxylation reaction mixture tends to set up into a gel which prevents completion of the dehydroxylation reaction. In order to prevent such gelation, the non-gelation agents hereinbefore described may be added to the reaction undergoing dehydroxylation. The amounts of non-gelation agents which are employed may range from 0.05 to 0.5 mole of estolide present or formed, and esterified in successive reactions. In the event that it is desired to prepare modified esters of dehydroxylated estolides as have been described above, larger amounts of the non-gelation agent may be employed, such as about 0.5 to 20 and preferably 2 to 10 moles of added agent per mole of esterified estolide.

The high molecular weight esters of unsaturated estolides and poly-functional alcohols can also be prepared by dehydroxylation of the estolides followed by esterification of the dehydroxylated estolides. Dehydroxylation of the estolide is carried out in the manner described above. The dehydroxylation may be performed in the presence of an added non-gelation agent, such as those which have been hereinbefore described, the presence of which assists in the completion of the dehydroxylation reaction and also participates in the subsequent esterification reaction wherein it tends to produce products which do not set up into gels during the reaction, and which products are soluble in hydrocarbon solvents.

In all of the foregoing reactions in which non-gelation agents are employed in the dehydroxylation reactions, abietic acid and/or a substance containing abietic acid, such as rosin and also styrene are the preferred non-gelation agents either in amounts to merely inhibit gelation or in greater amounts, to both inhibit gelation and modify the ester of the unsaturated estolide. We have also found that in certain of the esterification-dehydroxylation reactions involving the use of rosin as the non-gelation agent, turpentine which also is a non-gelation agent, considerably enhances both the esterification and the dehydroxylation in that the dehydroxylation may be carried out to completion without gelation at a lower temperature and the amount of esterification will be somewhat increased. The resulting product will be more soluble in hydrocarbon solvents. We have found that between about 10 and 200 weight per cent of turpentine based on the weight of rosin used is sufficient to obtain the improved results.

When reactions are carried out under conditions of incomplete dehydroxylation, the reaction product will consist of a mixture of dehydroxylated product and the unreacted material to be dehydroxylated. For example, when dehydroxylating esters in the absence of the added non-gelation agent, the dehydroxylation reaction does not proceed any further than about 20 to 30%, that is, the product will consist of about 20 to 30% of the dehydroxylated, unsaturated estolide ester and 70 to 80% of the unreacted ester.

While we have disclosed reactions of the estolides with poly-functional alcohols in the presence of non-gelation agents, we may also react the estolides with mono-functional alcohols in the presence of such non-gelation agents in a manner similar to that described above, whereby modified esters of the mono-functional alcohols and the estolides are obtained. We may also react the estolides directly with the non-gelation agents without the presence of the alcohols to obtain modified dehydroxylated estolides. Such reactions are likewise carried out in accordance with the foregoing disclosure.

The dehydroxylation of estolides is, in itself, a new method for the preparation of high molecular weight substituted acrylic acids and derivatives of these acids. Thus, the estolide may be prepared from the oxidation of selected paraffin wax fractions, and the estolide dehydroxylated to form the unsaturated estolide which has a structure corresponding to the ester of a high molecular weight acrylic acid and an alpha-hydroxy acid. Saponification of this ester (a dehydroxylated estolide) with strong caustic according to the methods described hereinbefore for the saponification of the estolides to produce the alpha-hydroxy acids, yields a mixture containing a high molecular weight substituted acrylic acid and an alpha-hydroxy acid. Since the alpha-hydroxy acid may be separated from the acidified saponification product with sodium borate solutions and the acrylic acid series does not form a complex with sodium borate, this provides a method of separation entirely analogous to the separation of fatty acids and neutrals from the alpha-hydroxy acids and estolides according to the methods hereinbefore described. Thus, the saponified unsaturated estolide is acidified to liberate the free acids, the free acids are removed as a separate phase, the acid phase is contacted with a hydrocarbon solvent, the mixture is extracted with sodium borate solution wherein the alpha-hydroxy acids are dissolved in the sodium borate layer from which they may be recovered as before by acidification of the complex layer with a strong mineral acid, and the purified high molecular weight substituted acrylic acid is recovered from the hydrocarbon layer by distillation of the hydrocarbon solvent therefrom.

The dehydroxylated estolides and/or esters of dehydroxylated estolides can be polymerized through their double bonds to form higher molecular weight compounds of a resinous nature. The polymerization of the unsaturated estolides and/or the esters of unsaturated estolides is catalyzed by such compounds as naphthene hydroperoxides, benzoyl peroxide, cumene peroxide, and other organic peroxides. Other polymerization catalyst such an manganese and cobalt soaps of carboxylic acids may also be employed. The polymerization catalyst is preferably employed in the amount of about 0.1 to 5 per cent by weight of the reactant or reactants and the preferred reaction temperatures range from 75 to 255° C. These compounds can also be thermally polymerized in the absence of a catalyst by heating to temperatures of about 255° C. for 20 to 60 hours, or at higher temperatures for shorter periods of time. Solvents may be employed to modify the formation of the polymer and such solvents as benzene, xylene, toluene and other coal tar or petroleum-derived aromatic hydrocarbons are particularly useful. Copolymerization agents may be employed in the polymerization to modify the polymer. Suitable copolymerization agents for this purpose include such materials as acrylonitrile, methyl acrylate, methyl methacrylate, acrylic acid and the like.

Our invention may perhaps be better understood by reference to the following examples:

EXAMPLE I

About 8600 parts by weight of a refined petroleum wax, having a melting point between 145° F. and 155° F. were introduced into an oxidation vessel provided with heating and cooling coils. The wax was melted and the temperature increased to about 265° F., at a pressure of about 75 to 80 pounds per square inch gauge. Air was employed as the oxidizing agent and was passed through the oxidation vessel at a rate of 5.5 cubic feet per barrel per minute. At the end of about 24 hours, the oxidation reaction had begun to progress satisfactorily and the temperature was lowered to 250° F. The course of the reaction is illustrated by reference to the following table showing the acid number of the wax being oxidized at various times during the reaction:

| Time, Hours: | Acid No. |
|---|---|
| 12 | Neutral |
| 24 | 1.4 |
| 30 | 12.6 |
| 36 | 36.0 |
| 48 | 70.6 |
| 60 | 108.1 |
| 72 | 131.6 |
| 90 | 154.0 |
| 120 | 206.0 |
| 132 | 250.0 |

During this particular oxidation, quantities of partially oxidized wax were withdrawn at two different intervals during the run, 680 parts by weight of 36 acid number wax and 1690 parts by weight of 102 acid number wax being withdrawn, leaving 4560 parts by weight of a wax oxidate which was oxidized to an acid number of 250. The latter wax oxidate having an acid number of 250 contains considerable amounts of useful low molecular weight organic acids which appear to be a mixture of fatty, hydroxy and dicarboxy acids which are water soluble, and these compounds were removed by extraction with between 5 and 10 volumes of hot water of about 100° C.

About 1000 parts by weight of the water-washed wax oxidate was subjected to the fractionation process using the borax method. This amount of wax oxidate was mixed with 1650 parts by weight of a 9.1 per cent by weight solution of sodium borate at a temperature of about 70° C. The mixture thus formed was then extracted three times with 1500 parts by weight of a light gasoline at a temperature of 70° C. and the resulting hydrocarbon and aqueous phases separated. The aqueous borax-soap-complex phase was subsequently heated to about 95° C. to evaporate the gasoline dissolved in the extraction step. The aqueous soap-complex phase was subsequently acidified with 69.5 parts by weight of 42% sulfuric acid whereby the alpha-hydroxy acids and estolides of alpha-hydroxy acids were separated. The separated alpho-hydroxy acid-estolide fraction was water washed to remove the inorganic acids and salts. The purified estolide-alpha-hydroxy acid fraction thereby produced contained about 5 per cent by weight of dissolved water.

The hydrocarbon or gasoline phase of hydrocarbon-soluble acids obtained in the extraction step was subjected to a further extraction with 192 parts by weight of a 13 per cent by weight solution of sodium borate in water at a temperature of 70° C. thereby forming a soap complex with the small amount of remaining alpha-hydroxy acids and estolides which were not retained in sodium borate solution during the extraction with light gasoline. The borax-soap-complex phase was separated and was acidified with 42% sulfuric acid to separate a crude alpha-hydroxy acid-estolide fraction. The hydrocarbon phase was subsequently extracted with 1670 parts by weight of a 5% by weight solution of sodium carbonate, thereby forming the water-soluble sodium soaps of the gasoline-soluble acids present. The aqueous sodium carbonate phase was subsequently separated and heated to about 95° C. to remove residual gasoline dissolved in the extraction step. The carbonate solution was then acidified with one equivalent of 42% sulfuric acid per equivalent of gasoline-soluble soap. The gasoline-soluble acids present as their sodium soaps are liberated as the acids and were water washed. This fraction comprises the purified fatty acids from the oxidized wax. The carbonate-water-washed hydrocarbon phase containing the neutral bodies was distilled to recover gasoline therefrom. The residual neutral product obtained thereby was comparatively pure.

The following table indicates per cent recovery of each of the fractions based on the water-washed oxidized wax, and the characteristics of each of the acid fractions obtained therefrom:

|  | Weight Percent Yields (Approx.) | Approximate Analysis | | |
|---|---|---|---|---|
|  |  | Acid No. | Sap. No. | Percent Neutrals |
| Alpha-hydroxy acids and Estolides | 48 | 207 | 349 | 3.0 |
| Naphtha-Soluble Fatty Acids | 36.4 | 160 | 226 | 3.0 |
| Neutral Compounds | 15.6 | 4 | 87 |  |

EXAMPLE II

A portion of the oxidized wax prepared in Example I having an acid number of about 250, was water washed three times with about 10 volumes of hot water at 100° C. in order to remove the water-soluble constituents. A portion of the water-washed oxidized wax amounting to 1000 parts by weight was slurried with about 10 volumes of light gasoline having a boiling range of 50 to 85° C. in order to remove the hydrocarbon-soluble material. The amber-colored, hydrocarbon-insoluble phase was twice extracted with a total of about 10 volumes of the light gasoline after which the insoluble phase was heated to about 95° C. to evaporate the light gasoline therefrom. The hydrocarbon-insoluble material amounted to 540 parts by weight, corresponding to a yield of 54% based on the water-washed oxidate. The composition of the hydrocarbon-insoluble fraction was as follows:

| Components: | Mole Percent of Total |
|---|---|
| Alpha-hydroxy acids | 23½ |
| Estolides | 52 |
| Fatty acids | 13½ |
| Neutral compounds | 11 |

EXAMPLE III

About 100 parts by weight of the hydrocarbon-insoluble fraction obtained in Example II was dissolved in approximately 1000 parts by weight of peroxide-free di-ethyl ether. The solution of the impure alpha-hydroxy acids in ether was then extracted four times with 50 parts by weight of a 10% by weight solution of sodium carbonate in water. The extracted ether solution was dried and the ether removed by distillation whereupon a "neutral oil" fraction substantially free of acids was obtained, corresponding to about 15 parts by weight of the original impure acid. The carbonate extraction solution was carefully acidified with 42% by weight of sulfuric acid while the mixture was rapidly stirred. The acidified extract was then extracted three times with equal volumes of peroxide-free ether whereupon the partially purified alpha-hydroxy acids and their estolides were removed in the ether phase from which they were subsequently recovered by evaporation of the ether. Analysis of the partially purified alpha-hydroxy acid-estolide fraction showed that it contained 10 mole per cent of fatty acids and substantially no neutral compounds.

EXAMPLE IV

About 400 parts by weight of the purified alpha-hydroxy acid-estolide fraction obtained in Example I, 200 parts by weight of potassium hydroxide, 200 parts by weight of water, 160 parts by weight of ethyl alcohol were introduced into a flask which was fitted with a gas trap, and the mixture was heated and maintained at 90° C. for approximately 4½ hours. At the end of this time no volatile gases had been evolved by the reaction mixture. The saponified mixture was then diluted with 2000 parts by weight of water and subsequently acidified to a pH of 3, with 10% sulfuric acid. During the acidification, the solution was vigorously agitated with air and the acid was added slowly and in such a way that the contact of the liberated acids with the mineral acid was minimized. The acidified mixture was then extracted with about 800 parts by weight of peroxide-free ether, water washed and dried and the ether then removed by evaporation. About 368 parts by weight of amber-colored enriched alpha-hydroxy acids were obtained therefrom, corresponding to a yield of 92% by weight based on the original mixture of alpha-hydroxy acids and estolides. Analysis of the saponification feed stock and product showed that on a neutral oil and fatty acid-free basis, the feed stock contained 72 mole per cent estolides and 28 mole per cent alpha-hydroxy acids, whereas the saponification product contained 11 mole per cent estolides and 89 mole per cent of alpha-hydroxy acids.

EXAMPLE V

Example IV was repeated with the exception that 10% hydrochloric acid was substituted for the sulfuric acid to acidify the diluted saponification mixture. Analysis of the saponified and acidified product obtained by this method showed 87 mole per cent alpha-hydroxy acids and 13 mole per cent estolides on a neutral oil and fatty acid-free basis.

EXAMPLE VI

Example IV was repeated with the exception that the impure alpha-hydroxy acid-estolide fraction obtained in Example II was used in place of the purified alpha-hydroxy acids from Example I. Results of the experiment showed that the alpha-hydroxy acid content was about 80 mole per cent and the estolide content about 20 mole per cent on a neutral oil and fatty acid-free basis.

EXAMPLE VII

About 100 parts by weight of the dry purified alpha-hydroxy acid-estolide mixture (approximately 28 mole per cent alpha-hydroxy acids) obtained in Example I and 45 parts by weight of refined xylenes were placed in a flask fitted with a reflux condenser and a water trap such that any water formed in the flask could be azeotroped overhead with the xylene, separated from the distillate by gravity into the water trap, collected and measured. The reaction mixture was refluxed for about 19 hours while the contents of the flask were maintained at about 150° C. The amount of water collected in the water trap corresponded to a theoretical conversion of the alpha-hydroxy acids to the estolide. The acid number and saponification number were determined on the reaction product and these data confirmed the fact that the estolide had been formed. The amount of side reaction, in which the estolide is dehydroxylated, was found to be about 5 mole per cent. A portion of the reaction product was evaporated to remove the xylene whereupon a light brown-colored estolide fraction was obtained.

EXAMPLE VIII

About 100 parts by weight of the purified alpha-hydroxy acids (approximately 72 mole per cent estolides and 28 mole per cent alpha-hydroxy acids) prepared in Example I and 45 parts by weight of benzene were added to a flask which was fitted with a reflux condenser and a water trap to collect any water formed in the reaction. The contents of the flask were maintained at about 100° C. for two hours during which time the water formed in the reaction was distilled into the trap and collected. The water corresponded to a conversion of 5 mole per cent of the alpha-hydroxy acids present therein to their estolides. About 5 grams of a benzene sulfonic acid catalyst was then added to the flask and the contents were refluxed for an additional 3½ hours while the contents of the flask were maintained at about 100° C. The water collected and the titration data for the reaction product showed that the conversion of the alpha-hydroxy acids to their estolides was about 100% complete and the dehydroxylation of the estolides amounted to only about 10 mole per cent.

EXAMPLE IX

About 100 parts by weight of the saponified and enriched alpha-hydroxy acids prepared as described in Example IV, and 45 parts by weight of benzene were added to a flask fitted with a reflux condenser and water trap to collect any water formed in the flask and distilled overhead. The mixture was refluxed by maintaining the contents of the flask at approximately 100° C. for seven hours. The water collected in the trap corresponded to 8 mole per cent conversion of the alpha-hydroxy acids to their estolides. About 5 parts by weight of benzene sulfonic acid was then added to catalyze the estolide formation and the mixture refluxed an additional 3½ hours while maintaining the reaction mixture at about 100° C. Analysis of the reaction product showed that the conversion of the alpha-hydroxy acids to their estolides was about 100% complete and the concurrent dehydroxylation of the estolides amounted to only about 10 mole per cent. The reaction product was treated with an amount of 6 molar sodium carbonate solution which was sufficient to just neutralize all of the benzene sulfonic acid catalyst present. The resultant mixture was washed four times with about 3 volumes of water per volume of mixture per wash. The mixture was then evaporated to remove the solvent whereupon the estolides were obtained. The final product was a brown viscous oily liquid with a greenish cast.

EXAMPLE X

Example VII was repeated with the exception that the saponified and enriched alpha-hydroxy acids prepared in Example IV were substituted for the mixture of estolides and alpha-hydroxy acids used as the feed stock in Example VII. After 20½ hours of refluxing, the conversion of the enriched alpha-hydroxy acids to their estolides was about 94% complete and the simultaneous dehydroxylation of the estolide amounted to only 10 mole per cent.

EXAMPLE XI

Approximately 100 parts of the relatively pure estolides dissolved in xylene which were obtained as the reaction product in Example VII were mixed with approximately 58 parts by weight of lauryl alcohol and the mixture was refluxed for about 100 hours by maintaining the contents of the flask at approximately 150° C. The titration data corresponded to about 100% esterification of the estolide. The reaction product comprised about 15 mole per cent of the dehydroxylated estolide on a solvent-free basis. The ester was obtained by evaporating the solvent in a vacuum from the reaction mixture. The ester is an oily liquid which is light brown in color.

EXAMPLE XII

About 100 parts by weight of estolides prepared according to the method described in Example VII were mixed with about 10 parts by weight of refined xylenes and about 11 parts by weight of sorbitol. The mixture was refluxed at a temperature of about 180° C. for about 7 hours. The titration data at the end of this period of time corresponded to about 51 mole per cent esterification of the free hydroxyl groups of the sorbitol. The dehydroxylation amounted to only 39 mole per cent. The ester obtained by the vacuum evaporation of the solvent from the reaction mixture was a reddish brown, tacky, elastic material. The reaction product was insoluble in the common solvents such as xylene, turpentine and alcohol.

EXAMPLE XIII

About 100 parts by weight of relatively pure estolides such as those prepared in Example VII were mixed with approximately 45 parts by weight of refined xylenes and about 15 parts by weight of glycerol. The mixture was refluxed for about 11 hours by maintaining the contents of the flask at about 160° C. At the end of this period the titration data corresponded to about 71 mole per cent esterification of the hydroxyl groups present in the glycerol. The dehydroxylation amounted to only 21 mole per cent. The solvent was removed from the reaction mixture by vacuum evaporation and the resulting ester was a reddish brown, tacky, semi-solid material.

EXAMPLE XIV

About 100 parts by weight of relatively pure estolides such as those prepared in Example VII were mixed with approximately 45 parts by weight of refined xylenes and about 15 parts by weight of glycol. The mixture was refluxed for about 12 hours by maintaining the contents of the flask at about 150° C. At the end of this period, the titration data corresponded to about 75 mole per cent esterification of the hydroxyl groups present in the glycol. The dehydroxylation reaction amounted to only 15 mole per cent. The ester was obtained by evaporation of the solvent from the reaction mixture. It was a reddish brown, viscous liquid insoluble in water but soluble in the common solvents.

EXAMPLE XV

About 100 parts by weight of the relatively pure estolide prepared in Example VIII, about 45 parts by weight of benzene, about 5 parts by weight of benzene sulfonic acid and about 58 parts by weight of lauryl alcohol were refluxed at a temperature of approximately 100° C. for about 2 hours. The titration data obtained on the product, and water formed, showed that the esterification reaction was 100% complete. The reaction product was freed of the catalyst according to the method described in Example IX. After evaporation of the solvent in vacuum, a product similar to that described in Example XI was obtained.

EXAMPLE XVI

About 100 parts by weight of relatively pure estolide prepared in Example VIII, about 45 parts by weight of benzene, about 5 parts by weight of benzene sulfonic acid and about 10 parts by weight of sorbitol were refluxed at a temperature of approximately 100° C. for approximately 6 hours. The water collected during the reaction period, as well as the titration data obtained on the product, showed that the esterification reaction was about 80% complete.

EXAMPLE XVII

About 100 parts by weight of relatively pure estolide prepared in Example VIII, about 45 parts by weight of benzene, about 5 parts by weight of benzene sulfonic acid and about 12 parts by weight of glycerol were refluxed at a temperature of approximately 100° C. for approximately 2 hours. The water collected during the reaction period, as well as the titration data obtained on the product, showed that the esterification reaction was about 77% complete.

EXAMPLE XVIII

Approximately 100 parts by weight of relatively pure estolide from Example VIII, about 45 parts by weight of benzene, about 5 parts by weight of benzene sulfonic acid were placed in a flask and maintained at a temperature near the boiling point of the mixture (about 100° C.). Vaporous ethyl alcohol obtained by boiling anhydrous alcohol was passed through a small glass superheating zone in order to raise its temperature to about 110° C. The superheated alcohol vapor was then introduced into the mixture contained in the flask. The excess alcohol vapor was allowed to distill from the reaction flask along with the water formed in the reaction and a large part of the benzene. At the end of about 5 hours, the reaction product was analyzed and it was found that the esterification of the estolide with the ethyl alcohol was about 100% complete. The reaction product was dissolved in an equal volume of xylene and treated with an amount of 6 molar sodium carbonate solution to just neutralize the benzene sulfonic acid catalyst present. The mixture was washed four times with three volumes of water per volume of reaction product per wash to remove the sodium benzene sulfonate thus formed. The washed product was evaporated in vacuum to remove the solvent whereupon a reddish brown, mobile liquid was obtained.

EXAMPLE XIX

Approximately 100 parts by weight of relatively pure estolide from Example VIII, about 45 parts by weight of benzene, about 5 parts by weight of benzene sulfonic acid were placed in a flask and maintained at a temperature near the boiling point of the benzene. Vaporous anhydrous methanol obtained by boiling anhydrous methanol was passed through a small superheating zone in order to raise its temperature to about 100° C. The superheated alcohol vapor was then introduced into the mixture contained in the flask. The excess alcohol vapor was allowed to distill from the reaction flask along with the water formed in the reaction and a large part of the benzene. At the end of about 5 hours, the reaction product was analyzed and it was found that the esterification of the estolide with the anhydrous methanol was about 100% complete. When the reaction product is treated to remove the catalyst and residual solvent as described in the preceding example, the methyl estolide is obtained which has physical properties which are very similar to those described in the preceding example for the ethyl estolide.

EXAMPLE XX

Approximately 100 parts of relatively pure estolides from Example VII about 45 parts by weight of refined xylenes, and about 5 parts by weight of benzene sulfonic acid were refluxed in a flask by maintaining the contents of the flask at approximately 150° C. for about 20 hours. The amount of water collected and the titration data obtained on the product showed that the estolide had been dehydroxylated to form an ester of a high molecular weight substituted acrylic acid and an alpha-hydroxy acid. The product was treated with an amount of 6 molar sodium carbonate solution which was sufficient to just neutralize the benzene sulfonic acid catalyst present. The mixture was washed four times with three volumes of water per volume of product per wash. The mixture was evaporated in a vacuum to remove the solvent whereupon the unsaturated estolide was obtained. The unsaturated estolide is a dark brown, viscous liquid. The acid number of the product was about 180 and the saponification number was about 350.

EXAMPLE XXI

Approximately 100 parts by weight of nearly pure estolides obtained by the vacuum evaporation of the xylene solvent from the reaction product of Example VII were dissolved in about 45 parts by weight of a 175 to 185° C. boiling range gasoline fraction. The resulting estolide-hydrocarbon mixture was then placed in a flask which was fitted with a reflux condenser and a water trap, and the mixture was maintained at a temperature of about 200° C. in order to provide a reflux. After about 30 hours of refluxing, the amount of water collected in the trap corresponded to about 50% of dehydroxylation of the estolide. The solvent was removed by evaporation in a vacuum. The acid number of the product was about 180 and its saponification number was about 350. The chemical and physical characteristics of the product were substantially identical to those of the product obtained in the preceding example with the exception that the product was lighter colored than in the preceding example.

EXAMPLE XXII

About 100 parts by weight of the ethyl ester of the estolide which was prepared according to the method described in Example XVIII were mixed with about 45 parts by weight of a narrow boiling range straight run hydrocarbon fraction from a gasoline and the mixture was refluxed at a temperature of about 200° C. for about 30 hours. The water collected showed that about 70 mole per cent of the ethyl ester of the estolide had been dehydroxylated wherein the dehydroxylated product consisted of an ester derived from a high molecular weight acrylic acid and the ethyl ester of an alpha-hydroxy acid. The solvent was removed from the reaction product by evaporation in a vacuum. The product was a reddish brown, viscous oil.

EXAMPLE XXIII

About 100 parts by weight of the ethyl ester of the estolides obtained in Example XVIII, about 45 parts by weight of refined xylenes, and about 5 parts by weight of benzene sulfonic acid were placed in a flask fitted with a reflux condenser and a water trap. The mixture was refluxed at a temperature of about 150° C. for about 30 hours during which time the water collected in the trap showed that the dehydroxylation of the ethyl ester was 100% complete. When the solvent and catalyst were removed as described in Example XVIII, a product was obtained which is similar to that obtained in the preceding example. The product of this example has a darker color however.

EXAMPLE XXIV

About 100 parts by weight of the lauryl ester of the estolides obtained in Example XI, about 45 parts by weight of refined xylenes, and about 5 parts by weight of benzene sulfonic acid were placed in a flask fitted with a reflux condenser and a water trap. The mixture was refluxed at a temperature of about 150° C. for about 30 hours during which time the water collected in the trap showed that the dehydroxylation of the lauryl ester was 100% complete. When the catalyst and solvent are removed according to the method described in Example XVIII, a brown, viscous liquid of mild pleasant odor was obtained.

EXAMPLE XXV

About 100 parts by weight of the glyceryl ester of the estolides obtained in Example XIII, about 45 parts by weight of refined xylenes, and about 5 parts by weight of benzene sulfonic acid were placed in a flask fitted with a reflux condenser and a water trap. The mixture was refluxed at a temperature of about 150° C. for about 1 hour at which time gelation occurred. The water collected in the trap showed that the dehydroxylation of the glyceryl ester was 45% complete.

EXAMPLE XXVI

The unsaturated estolide prepared according to the method described in Example XX but still containing benzene sulfonic acid was treated with sodium carbonate in amount sufficient to just neutralize the catalyst. The sodium benzene sulfonate was removed from the mixture by washing it four times with water, employing an equal volume of water per volume of material in each wash. The xylene solvent was evaporated from the product. About 100 parts by weight of this solvent-free and catalyst-free unsaturated estolide, about 58 parts by weight of lauryl alcohol and about 45 parts by weight of refined xylenes were placed in a flask fitted with reflux condenser and a water trap. The mixture was refluxed for approximately 18 hours by maintaining the contents of the flask at 150° C. The amount of water collected, as well as the titration data, showed that the dehydroxylated estolide has been esterified, thereby forming an ester derived from a high molecular weight substituted acrylic acid and the lauryl ester of the alpha-hydroxy acid. The product was evaporated in a vacuum to remove the solvent whereupon a lauryl ester was obtained. It was a reddish brown, viscous liquid.

EXAMPLE XXVII

About 100 parts by weight of the solvent and catalyst-free unsaturated estolide prepared according to the methods described in Examples XX and XXVI, about 12.5 parts by weight of pentaerythritol and about 45 parts by weight of refined xylene were placed in a flask fitted with a reflux condenser and a water trap. The mixture was refluxed for approximately 4 hours by maintaining the contents of the flask at 150° C. at which time gelation occurred. The amount of water collected, as well as the titration data, showed that the dehydroxylated estolide had been about 50% esterified, thereby forming an ester derived from a high molecular weight substituted acrylic acid and the pentaerythritol ester of the alpha-hydroxy acid.

EXAMPLE XXVIII

The unsaturated estolide prepared according to the method described in Example XX and containing the catalyst and xylenes were heated to evaporate the xylenes. About 105 parts by weight of this product containing about 5 parts by weight of benzene sulfonic acid, about 58 parts by weight of lauryl alcohol and about 45 parts by weight of benzene were added to a flask fitted with a reflux condenser and a water trap to collect the water formed in the reaction. The contents of the flask were refluxed by maintaining the temperature at approximately 100° C. for about 5 hours. The water collected during this period and the titration data obtained on the reaction product showed that the unsaturated estolide had been esterified with the lauryl alcohol, thereby forming an ester derived from a high molecular weight substituted acrylic acid and the lauryl ester of an alpha-hydroxy acid. When the solvent and catalyst were removed as described in Example XVIII, a product similar to that obtained in Example XXVI resulted.

EXAMPLE XXIX

The normal or undehydroxylated estolide fraction obtained in Example VIII containing benzene sulfonic acid and benzene was heated to evaporate the benzene. About 105 parts by weight of this product containing about 5 parts by weight of benzene sulfonic acid and 100 parts by weight of the normal estolides, about 58 parts by weight of lauryl alcohol, and about 45 parts by weight of refined xylenes were placed in a flask fitted with a reflux condenser and a water trap. The mixture was refluxed at a temperature of approximately 150° C. for about 30 hours. Examination of the product showed that the normal estolide had been simultaneously dehydroxylated and esterified with the lauryl alcohol. The product consisted principally of the lauryl ester derived from a high molecular weight substituted acrylic acid and the lauryl ester of an alpha-hydroxy acid.

EXAMPLE XXX

About 105 parts by weight of the normal estolide containing 5 parts by weight of benzene sulfonic acid such as is prepared according to the methods described in Examples VIII and XXVIV, about 12 parts by weight of glycerol, and about 45 parts by weight of refined xylene were placed in a flask fitted with a reflux condenser and a water trap. The mixture was refluxed at a temperature of approximately 150° C. for about 1 hour, at which time gelation took place. Examination of the product showed that the normal estolide had been about 25% dehydroxylated and 75% esterified with the glycerol. The product consisted principally of the ester derived from a high molecular weight substituted acrylic acid and the glycerol ester of an alpha-hydroxy acid.

EXAMPLE XXXI

About 100 parts by weight of the purified mixture of estolides and alpha-hydroxy acids obtained from oxidized wax as described in Example I and comprising 70 mole per cent estolides and 30 mole per cent alpha-hydroxy acids, about 58 parts by weight of lauryl alcohol, about 5 parts by weight of benzene sulfonic acid, and about 45 parts by weight of refined xylenes were placed in a flask fitted with a reflux condenser and a water trap. The mixture was refluxed at a temperature of approximately 150° C. for about 30 hours. The water collected and the titration data obtained on the reaction product showed that the principal product of the reaction was the dehydroxylated lauryl ester of the estolide. After removal of the solvent and catalyst, as described in Example XVIII, a viscous dark brown liquid was obtained.

EXAMPLE XXXII

About 100 parts by weight of saponified and enriched alpha-hydroxy acids which contained 89 mole per cent of alpha-hydroxy acids and 11 mole per cent of estolides prepared according to Example IV, and about 58 parts by weight of lauryl alcohol, about 5 parts by weight of benzene sulfonic acid, and about 45 parts by weight of benzene were placed in a flask fitted with a reflux condenser and a water trap. The mixture was refluxed at about 100° C. for approximately 50 hours. The water collected in the water trap and the titration data obtained on the reaction product showed that the principal product of the reaction was the lauryl ester of the normal estolide derived from the original alpha-hydroxy acids.

EXAMPLE XXXIII

About 100 parts by weight of saponified and enriched alpha-hydroxy acids comprising 89 mole per cent of alpha-hydroxy acids and 11 mole per cent of estolides, prepared according to Example IV, about 58 parts by weight of lauryl alcohol, about 5 parts by weight of benzene sulfonic acid and about 45 parts by weight of refined xylenes were placed in a flask fitted with a reflux condenser and a water trap. The mixture was refluxed at a temperature of 150° C. for a period of about 30 hours. The reaction product consisted principally of the lauryl ester of the dehydroxylated estolide.

EXAMPLE XXXIV

About 100 parts by weight of the saponified and enriched alpha-hydroxy acids comprising 89 mole per cent of alpha-hydroxy acids and 11 mole per cent of estolides prepared according to Example IV, about 5 parts by weight of benzene sulfonic acid and about 45 parts by weight of refined xylenes were placed in a flask fitted with a reflux condenser and a water trap. The mixture was refluxed for about 30 hours at a temperature of approximately 150° C. Examination of the reaction product shows that it consisted principally of the dehydroxylated estolide derived from the original alpha-hydroxy acids.

EXAMPLE XXXV

About 80 parts by weight of the mixture comprising approximately 70 mole per cent of estolides and 30 mole per cent alpha-hydroxy acids prepared according to the method described in Example I, about 22 parts by weight of purified rosin (equivalent to approximately 20 parts by weight of the estolide alpha-hydroxy acid mixture), about 12 parts by weight of glycerol, and about 9 parts by weight of refined xylenes were placed in a flask fitted with a reflux condenser and a water trap. The mixture was refluxed for about 22 hours by maintaining the contents of the flask at about 200 to 210° C. The reaction product resulting therefrom was a clear, amber-colored, viscous homogeneous liquid. The amount of water collected during the reaction, and the titration data obtained on the product indicated that the esterification of the glycerol had proceeded to approximately 77% and the dehydroxylation of the alpha-hydroxy acids had proceeded to about 100%.

In order to evaluate the drying properties of the reaction product, sufficient amounts of the reaction product was mixed with xylenes to produce a xylene solution containing about 10% by weight of the reaction product on a solvent-free basis. This solution was mixed with about 1/10% by weight, based on the reaction product, of a cobalt naphthenate drying oil catalyst which contained about 6% by weight of cobalt metal. Aluminum metal strips were coated with this solution. One of the coated strips was allowed to dry at room temperature (20 to 25° C.) and at the end of three hours of drying, a tough, flexible non-tacky coating remained on the metal panel, which was resistant to the action of such solvents as xylene, benzene, carbon tetrachloride, petroleum ether and the like. A second strip was allowed to dry for one hour at 40 to 45° C. and this exhibited properties similar to those described for the other panel.

When the foregoing experiment was repeated under the same conditions except that the rosin was omitted from the reaction mixture and replaced by the equivalent 20 parts of the estolide-alpha-hydroxy acid mixture, the data obtained by titration of the reaction product and the water collected during the course of the reaction showed that the esterification was about 71% complete and the dehydroxylation to unsaturation was about 45%. While the reaction product thus obtained was a very soft gel which was not completely miscible with any of the common paint vehicles including xylenes, toluene and turpentine, and did not show drying oil properties, the product was nevertheless a clear, amber-colored product which for many purposes, as for example, in the production of plastics, is desirable.

EXAMPLE XXXVI

About 80 parts by weight of a mixture comprising approximately 70 mole per cent of estolides and 30 mole per cent of alpha-hydroxy acids such as is prepared according to the method described in Example I, about 22 parts by weight of purified rosin, about 12.5 parts by weight of pentaerythritol and about 9 parts by weight of refined xylenes were placed in a flask fitted with a reflux condenser and a water trap. The mixture was refluxed at a temperature of approximately 190 to 200° C. for approximately 2½ hours, at which time the refluxing was discontinued at the appearance of gel formation. The product was about 55% esterified based on the pentaerythritol content, and about 20% dehydroxylated to unsaturation based on the alpha-hydroxy acid-estolide content. The product was a very soft, extremely tacky gel at room temperature (25° C.).

When the foregoing experiment was repeated but the refluxing was stopped at the end of several minutes prior to the 2½ hours, there was no appearance of gelation and the product was a clear, amber-colored, viscous homogeneous liquid.

When the foregoing experiment was repeated but the rosin was replaced with an equivalent amount of the estolide-alpha-hydroxy acid mixture, the resulting product was about 71% esterified and less than 5% dehydroxylated. The product was markedly elastic, resembling raw sponge rubber and did not possess drying oil properties.

EXAMPLE XXXVII

The following illustrates the effect of the presence of rosin during esterification and dehydroxylation. In one experiment about 100 parts by weight of the purified mixture of alpha-hydroxy acids and estolides prepared in Example I, about 12 parts by weight of glycerol, and about 4.5 parts by weight of refined xylenes were placed in a flask fitted with a reflux condenser and a water trap and the mixture was refluxed while the contents were maintained at about 200° C. At the end of about 3½ hours of refluxing, the reaction mixture had gelled and the refluxing was discontinued. In the second experiment, about 80 parts by weight of the purified mixture of alpha-hydroxy acids and estolides, about 22 parts by weight of purified rosin, about 12 parts by weight of glycerol, and about 4.5 parts by weight of refined xylenes were refluxed in the same manner at 200° C. At the end of 4½ hours, the reaction mixture became gelled and the refluxing was discontinued. In a third experiment, about 72 parts by weight of the purified mixture of alpha-hydroxy acids and estolides, about 30 parts by weight of purified rosin, about 12 parts by weight of glycerol and about 4.5 parts by weight of refined xylenes were refluxed at 200° C. At the end of 5½ hours gelation occurred and the reaction was discontinued. In a fourth experiment, about 67 parts by weight of purified alpha-hydroxy acids and estolides, about 36 parts by weight of purified rosin, about 12 parts by weight of glycerol and about 4.5 parts by weight of refined xylenes were refluxed at 200° C. At the end of 6½ hours gelation occurred and the reaction was discontinued.

In each of the foregoing experiments, the amount of esterification and the extent of dehydroxylation on the product were determined from titration data and the amount of water liberated during the reaction. The following data illustrate the effect of the added rosin on the course and nature of the reaction:

*Table 1*

| Percent of Rosin based on the Wt. of the AHA, Estolides, and Rosin, Percent by Weight | Reaction Time at Which Gelation Occurred | Esterfication, Percent Completed | Dehydroxylation, Percent Completed |
|---|---|---|---|
| 0 | 3.5 | 68 | 45 |
| 20 | 4.5 | 70 | 58 |
| 28 | 5.5 | 70 | 72 |
| 33 | 6.5 | 70 | 92 |

It is apparent from the above tabulation of data that the addition of rosin delays the time in which the reaction mixture is gelled and also increases the extent of dehydroxylation. The effect of rosin on the degree of esterification is insignificant in this case.

The gelled products prepared in the four preceding experiments of this example are generally useful in the preparation of resins and for incorporating in resins. For such uses as drying oils, the non-gelled products are more desirable because of their greater solubility in aromatic solvents. The four experiments were repeated with the exception that the refluxing was discontinued after 2.5, 3.5, 4.5 and 5.5 hours, respectively, in order to stop the reaction prior to gel formation. All of the products were soluble in aromatic solvents. When the products were evaluated as drying oils as described in Example XXXV, it was found that the products prepared with rosin gave tougher and faster drying films on the metal strips when compared with the preparations which did not employ rosin. Furthermore, the product which contained the 33% rosin based on the weight of the estolides and alpha-hydroxy acids was the most completely dehydroxylated (82%) and was also the preparation with the best drying properties.

EXAMPLE XXXVIII

The following example illustrates the effect of the presence of rosin and a catalyst during the esterification and dehydroxylation reaction. In the first experiment about 100 parts by weight of purified alpha-hydroxy acids and estolides prepared in Example I, about 12 parts by weight of glycerol, and about 9.5 parts by weight of toluenes were placed in a flask fitted with a reflux condenser and a water trap and refluxed at 140° C. At the end of 16 hours, gelation occurred and the reaction was discontinued. In a second experiment, about 100 parts by weight of alpha-hydroxy acids and estolides, about 5 parts by weight of benzene sulfonic acid catalyst and about 9 parts by weight of toluene were refluxed at a temperature of 140° C. At the end of about 50 minutes, gelation occurred and the reaction was discontinued. In a third experiment, about 80 parts by weight of purified alpha-hydroxy acids and estolides, about 22 parts by weight of rosin, about 12 parts by weight of glycerol and about 9.5 parts by weight of benzene were refluxed at a temperature of about 140° C. At the end of about 22 hours the reaction mixture set to a gel and the refluxing was discontinued. In a fourth experiment about 80 parts of alpha-hydroxy acids and estolides, about 22 parts by weight of rosin, about 12 parts by weight of glycerol, about 5 parts by weight of benzene sulfonic acid and 9.5 parts by weight of benzene were refluxed at a temperature of 140° C. At the end of 2 hours and 10 minutes, the reaction mixture had set to a gel and the reaction was discontinued.

In each of the foregoing reactions the amount of esterification and dehydroxylation was determined from the amount of water liberated during the reaction time and from the titration data.

*Table 2*

| Description of Reaction Conditions | Reaction Time at Which Gelation Occurred | Esterification, Percent Completed | Dehydroxylation, Percent Completed |
|---|---|---|---|
| 0% Catalyst, 0% Rosin | 16 Hours | 71 | 21 |
| 5% Catalyst, 0% Rosin | 50 Minutes | 77 | 45 |
| 0% Catalyst, 20% Rosin | 22 Hours | 63 | 56 |
| 5% Catalyst, 20% Rosin | 2 Hrs.—10 Min. | 65 | 100 |

The above tabulation of data illustrates the fact that rosin also promotes the dehydroxylation reaction at lower temperatures by delaying the time at which gelation occurs. Furthermore, the action of rosin in the presence of an added dehydroxylation catalyst delays gelation such that the dehydroxylation can be substantially completed at relatively low temperatures without the formation of a gelled product.

The gelled products in the four preceding experiments of this example are useful in the preparation of resins and modified resins. For such uses as drying oils, the non-gelled products are more desirable because of their greater solubility in aromatic solvents. The four experiments were repeated with the exception that the refluxing was discontinued at the end of 14, 0.6, 17, and 1.9 hours in the first, second, third and fourth experiments respectively. The resultant products were completely miscible with aromatic solvents, such as xylene. The two products containing the catalysts were separately treated with an amount of sodium carbonate at a temperature of 80° C. which was just sufficient to neutralize the benzene sulfonic acid catalysts, and then water washed at a temperature of 80° C. four times, each employing three volumes of water per volume of product to remove the sodium benzene sulfonate. The xylene solutions containing 10 per cent by weight on a solvent-free basis of each of the two catalyst-freed products and of each of the two non-catalyst-containing products were prepared, and mixed with a drying catalyst as described in Example XXXV. Aluminum metal strips were coated with the four mixtures. The two rosin-containing samples yield tougher films and also dried more quickly than the non-rosin-containing preparations. The non-rosin-containing preparation yielded dried films which are useful but are nevertheless inferior to those which can be obtained with use of rosin.

EXAMPLE XXXIX

The following example illustrates the effect of the presence of rosin and turpentine during the esterification and dehydroxylation reaction. In the first experiment, about 100 parts by weight of purified alpha-hydroxy acids and estolides prepared in Example I, about 12 parts by weight of glycerol, and about 4.5 parts by weight of refined xylenes were refluxed at 200° C. At the end of 3½ hours, gelation occurred and the reaction was stopped. In a second experiment, about 80 parts by weight of purified alpha-hydroxy acids and estolides, about 22 parts by weight of rosin, about 4.5 parts by weight of refined xylenes were refluxed at a temperature of 200° C. At the end of 4½ hours, gelation occurred and the reaction was stopped. In a third experiment, about 100 parts by weight of purified alpha-hydroxy acids and estolides, about 20 parts by weight of turpentine, about 12 parts by weight of glycerol were refluxed at a temperature of 200° C. At the end of 4 hours, gelation occurred and the reaction was stopped. In a fourth experiment, about 80 parts by weight of purified alpha-hydroxy acids and estolides, about 22 parts by weight of purified rosin, about 20 parts by weight of turpentine were refluxed at a temperature of 200° C. At the end of 8½ hours, the reaction mixture set up a gel and the reaction was stopped.

The extent of esterification and dehydroxylation reactions were followed from the amount of water liberated during the reaction and from the titration data obtained on the product. The following data were obtained:

Table 3

| Wt. Percent cent of Rosin | Wt. Percent of Turpentine | Time Required for Gelation to occur, Hours | Esterification, Percent Completed | Dehydroxylation, Percent Completed |
|---|---|---|---|---|
| 0 | 0 | 3.5 | 68 | 40 |
| 20 | 0 | 4.5 | 70 | 58 |
| 0 | 20 | 4.0 | 70 | 45 |
| 20 | 20 | 8.5 | 88 | 71 |

The above data show that the addition of turpentine alone increases the dehydroxylation reaction slightly and increases the gelation time. It has a negligible effect on the esterification reaction. The addition of rosin alone promotes the dehydroxylation reaction more than does the turpentine and also is more effective than turpentine for delaying the gelation time. The simultaneous addition of turpentine and rosin shows a pronounced increase in both the dehydroxylation reaction and the time required for gelation and, furthermore, the combined action of rosin and turpentine also increases the esterification reaction which effect is not observed with either added component in the absence of the other.

The gelled products in the four preceding experiments of this example are useful in the preparation of resins and modified resins. For such uses as drying oils, the non-gelled products are more desirable because of their greater solubility in aromatic solvents. The four experiments were repeated with the exception that the refluxing was discontinued at the end of 2.5, 3.5, 3.0 and 6.5 hours for the first, second, third, and fourth experiments respectively. The non-gelled products were miscible with aromatic solvents. When a 10% by weight solution on a solvent-free basis of each of the reaction products in an aromatic solvent was prepared and tested for its drying properties as described in Example XXXV, it was found that the preparation employing both rosin and turpentine dried the fastest and also furnished the toughest film. The preparation employing the rosin but no turpentine was second best and the preparation employing the turpentine but no rosin was third best.

EXAMPLE XL

In another series of experiments, about 100 parts by weight of purified alpha-hydroxy acids and estolides prepared according to the method described in Example I, about 12 parts by weight of glycerol, and about 9.5 parts by weight of xylenes were refluxed in the presence and absence of styrene, in the presence and absence of benzene sulfonic acid as indicated in the following table until the reaction mixture had reached the point of gelation, at which time the refluxing was discontinued. The extent of the esterification and dehydroxylation were determined by the amount of water formed in the reaction and from the titration data obtained on the reaction product. The following tabulated data were obtained:

Table 4

| Exper. No. | Styrene, Wt. Percent of the Alpha-hydroxy Acids-Estolides | Benzene Sulfonic Acid, Wt. Percent of the Alpha-hydroxy Acids-Estolides | Reaction Time At Gelation, Hours | Esterification, Percent Complete | Dehydroxylation, Percent Complete |
|---|---|---|---|---|---|
| 1 | 0 | 0 | 10 | 71 | 21 |
| 2 | 15 | 0 | 11 | 63 | 30 |
| 3 | 200 | 0 | 15 | 65 | 35 |
| 4 | 15 | 0.5 | 1.2 | 64 | 50 |
| 5 | 15 | 5.0 | 1.8 | 72 | 73 |
| 6 | 0 | 5.0 | 0.6 | 79 | 54 |

The six experiments were repeated with the exception that the refluxing was discontinued at the end of 8, 9, 12, 1.0, 1.5 and 0.4 hours for the first through sixth experiments respectively. The catalyst was removed from each of the three catalyst-containing products according to the method described in Example XXXVIII.

Each of the six products was evaluated for drying properties according to the method described in Example XXXV. The catalytically dehydroxylated samples employing styrene in their preparation had shorter drying times and gave desirable films. The sample prepared with 5% by weight of catalyst was superior to the one prepared with only 0.5% by weight of catalyst in these respects.

The sample prepared with 200% by weight of styrene gave a remarkably tough and resilient film as contrasted with the dried films of the other samples. All samples prepared with styrene had superior drying properties as compared with the sample which did not employ styrene in its preparation.

The foregoing disclosure of our invention is not to be considered as limiting since many variations may be made by those skilled in the art without departing from the scope or spirit of the following claims.

We claim:

1. A process for the production of an ester of an unsaturated estolide from a carboxylic acid selected from the class consisting of water-insoluble alpha-hydroxy acids, water-insoluble estolides of said alpha-hydroxy acids and mixtures thereof, said alpha-hydroxy acids containing 6 to 30 carbon atoms per molecule and being straight-chain unsubstituted aliphatic alpha-hydroxy monocarboxylic acids, which comprises heating said carboxylic acids with a saturated unsubstituted aliphatic alcohol in the ratio of 0.5 to 2 moles of acid per mole of hydroxyl group in the alcohol in the presence of between 0.05 and 20 moles of an acidic non-gelation agent per mole of acid at temperatures between 100° C. and 200° C. for a time sufficient to effect esterification and dehydroxylation and removing water formed during the heating, said acidic non-gelation agent being an organic acid containing a conjugated diene grouping.

2. A process according to claim 1 wherein the heating is effected in the presence of between 0.1 and 10% of an acid catalyst and the temperature is between 100° C. and 150° C.

3. A process according to claim 1 wherein the alcohol is a polyhydroxy alcohol.

4. A process according to claim 1 wherein the alcohol is glycerol.

5. A process according to claim 1 wherein the alcohol is pentaerythritol.

6. A process for the production of an ester of an unsaturated estolide from a carboxylic acid selected from the class consisting of water-insoluble alpha-hydroxy acids, water-insoluble estolides of said alpha-hydroxy acids and mixtures thereof, said alpha-hydroxy acids containing 6 to 30 carbon atoms per molecule and being straight-chain unsubstituted aliphatic alpha-hydroxy monocarboxylic acids, which comprises reacting said carboxylic acid with a saturated unsubstituted aliphatic alcohol in the ratio of 0.5 to 1.5 moles of acid per mole of hydroxyl group in the alcohol in the presence of between 0.5 and 20 moles of rosin per mole of carboxylic acid at temperatures between 100° C. and 150° C. and removing water formed during the reaction to form the ester of an estolide and dehydroxylating said ester of an estolide at temperatures between 100° C. and 200° C. to produce the ester of an unsaturated estolide.

7. A process for the production of an ester of an unsaturated estolide from a carboxylic acid selected from the class consisting of water-insoluble alpha-hydroxy acids, water-insoluble estolides of said alpha-hydroxy acids and mixtures thereof, said alpha-hydroxy acids containing 6 to 30 carbon atoms per molecule and being straight-chain unsubstituted aliphatic alpha-hydroxy monocarboxylic acids, which comprises heating said carboxylic acid in the presence of between 0.1% and 10% of a benzene sulfonic acid and between 0.5 and 20 moles of rosin per mole of carboxylic acid at a temperature between 100° C. and 150° C. and removing water formed during said heating, adding a saturated unsubstituted aliphatic alcohol in an amount such that the ratio of carboxyl groups to hydroxyl groups of the alcohol is between 0.5 and 2.0 and heating the resulting mixture at a temperature between 100° C. and 150° C. for a time sufficient to effect esterification, said carboxylic acid being obtained by oxidizing a straight-chain paraffinic carbon mixture containing between 15 and 50 carbon atoms per molecule and having a melting point between about 90° F. and 165° F. in the liquid phase with a gas containing free oxygen at a temperature between 100° C. and 130° C., continuing the oxidation until the acid number of the product is between 200 and 250, water-washing the oxidized product and separating a fraction comprising alpha-hydroxy acids from the water-washed oxidation product.

8. A process for the production of dehydroxylated estolides which comprises heating a mixture of water-insoluble alpha-hydroxy acids and water-insoluble estolides of said alpha-hydroxy acids, said alpha-hydroxy acids containing 6 to 30 carbon atoms per molecule and being straight-chain unsubstituted aliphatic alpha-hydroxy monocarboxylic acids, in the presence of between 0.05 and 20 moles of rosin per mole of acid and 0.1% to 10% of an acid catalyst at a temperature between 100° C. and 150° C. and removing water from the reaction mixture as it is formed.

9. An unsaturated ester prepared by heating a carboxylic acid selected from the class consisting of water-insoluble alpha-hydroxy acids, water-insoluble estolides of said alpha-hydroxy acids and mixtures thereof, said alpha-hydroxy acids containing 6 to 30 carbon atoms per molecule and being straight-chain unsubstituted aliphatic alpha-hydroxy monocarboxylic acids, with an amount of a saturated unsubstituted aliphatic alcohol such that the ratio of carboxyl groups of the acid to hydroxyl groups of the alcohol is between 0.5 and 2.0, in the presence of 0.05 to 20% of an acidic non-gelation agent at a temperature between 100° C. and 200° C. until the formation of water ceases, said acidic non-gelation agent being an organic acid containing a conjugated diene grouping.

References Cited in the file of this patent
UNITED STATES PATENTS

| Number | Name | Date |
|---|---|---|
| 1,785,930 | Bradley | Dec. 23, 1930 |
| 1,802,154 | Michael | Apr. 21, 1931 |
| 1,892,425 | Ellis | Dec. 27, 1932 |
| 1,982,822 | Meigs | Dec. 4, 1934 |
| 2,156,737 | Priester | May 2, 1939 |
| 2,164,188 | Groll | June 27, 1939 |
| 2,273,891 | Pollak et al. | Feb. 24, 1942 |
| 2,303,842 | Kirk et al. | Dec. 1, 1942 |
| 2,318,669 | Carr | May 11, 1943 |
| 2,341,258 | Appel | Feb. 8, 1944 |
| 2,371,235 | Gardner | Mar. 13, 1945 |
| 2,373,228 | De Groote et al. | Apr. 10, 1945 |
| 2,374,081 | Dean | Apr. 17, 1945 |
| 2,375,629 | D'Alelio | May 8, 1945 |
| 2,381,486 | Cohen et al. | Aug. 7, 1945 |
| 2,486,454 | Zellner | Nov. 1, 1949 |
| 2,534,255 | Filachione | Dec. 19, 1950 |

FOREIGN PATENTS

| Number | Country | Date |
|---|---|---|
| 600,653 | Great Britain | Apr. 15, 1948 |

OTHER REFERENCES

Nagel: Berichte, vol. 70, pp. 2173–79 (1937).
Ajmani: Jour. Sci. Ind. Research (Indian), vol. 3, p. 354 (1945).